(12) United States Patent
Hasegawa et al.

(10) Patent No.: US 9,923,369 B2
(45) Date of Patent: Mar. 20, 2018

(54) MULTILEVEL POWER CONVERTOR

(71) Applicant: MEIDENSHA CORPORATION, Tokyo (JP)

(72) Inventors: Isamu Hasegawa, Numazu (JP); Takashi Kodama, Numazu (JP); Takeshi Kondo, Mishima (JP); Shota Urushibata, Odawara (JP)

(73) Assignee: MEIDENSHA CORPORATION, Tokyo (JP)

( * ) Notice: Subject to any disclaimer, the term of this patent is extended or adjusted under 35 U.S.C. 154(b) by 253 days.

(21) Appl. No.: 14/900,950

(22) PCT Filed: May 23, 2014

(86) PCT No.: PCT/JP2014/063717
§ 371 (c)(1),
(2) Date: Dec. 22, 2015

(87) PCT Pub. No.: WO2014/208232
PCT Pub. Date: Dec. 31, 2014

(65) Prior Publication Data
US 2016/0141870 A1 May 19, 2016

(30) Foreign Application Priority Data

Jun. 25, 2013 (JP) ................................ 2013-132261

(51) Int. Cl.
| | |
|---|---|
| *H02J 3/00* | (2006.01) |
| *H02M 7/487* | (2007.01) |
| *H02M 7/44* | (2006.01) |
| *H02M 7/483* | (2007.01) |
| *H02M 1/00* | (2006.01) |

(52) U.S. Cl.
CPC ................ *H02J 3/00* (2013.01); *H02M 7/44* (2013.01); *H02M 7/483* (2013.01); *H02M 7/487* (2013.01);

(Continued)

(58) Field of Classification Search
CPC ........ H02J 3/01; H02J 3/38; H02J 3/32; H02J 1/04; H02J 1/12; H02J 1/14; H02J 5/005;
(Continued)

(56) References Cited

FOREIGN PATENT DOCUMENTS

| | | |
|---|---|---|
| EP | 2 568 591 A1 | 3/2013 |
| JP | 08-251940 A | 9/1996 |

(Continued)

OTHER PUBLICATIONS

Xiaofeng Yang et al., Power Quality Controller Based on Hybrid Modular Multilevel Converter, IEEE International Symposium on Industrial Electronics, May 28, 2012, pp. 1997-2002.

(Continued)

*Primary Examiner* — John Poos
(74) *Attorney, Agent, or Firm* — Foley & Lardner LLP

(57) ABSTRACT

Basic circuit of U phase includes first to fourth semiconductor elements (SU1.1 to SU1.4) connected between positive and negative ends of DC voltage source (DCC1), fifth semiconductor element (SU1.5) connected to a common connection point of the first and second semiconductor elements (SU1.1, SU1.2), and sixth semiconductor element (SU1.6) connected to a common connection point of the third and fourth semiconductor elements (SU1.3, SU1.4). Flying capacitor (FC1) is inserted between the fifth semiconductor element (SU1.5) and the sixth semiconductor element (SU1.6). Voltage selection circuits have the common connection points of the second and third semiconductor elements (SU1.2, SU1.3) of the respective basic circuits as input terminals, and includes semiconductor elements (SU1 to SU4) between the input terminals and output terminals (U, V, W). Consequently, it is possible to output arbitrary voltage in all phases in multilevel power convertor, and to simplify control for outputting arbitrary voltage level in all phases.

18 Claims, 29 Drawing Sheets

(52) U.S. Cl.
CPC .......... *H02M 2001/007* (2013.01); *H02M 2007/4835* (2013.01)

(58) Field of Classification Search
CPC .......... H02M 7/04; H02M 7/44; H02M 3/07; H02M 1/14; H02M 1/44; H02M 1/32; H02M 1/42
USPC .......... 307/63, 77, 78; 363/71, 131, 132
See application file for complete search history.

(56) References Cited

FOREIGN PATENT DOCUMENTS

| JP | 2012-209368 A | 10/2012 |
|---|---|---|
| JP | 2013-102674 A | 5/2013 |
| JP | 2014-064431 A | 4/2014 |

OTHER PUBLICATIONS

Toufann Chaudhuri et al, The Common Cross-Connected Stage for the 5L ANPC Medium Voltage Multilevel Inverter, IEEE Transactions on Industrial Electronics, vol. 57, No. 7, Jul. 1, 2010, pp. 2279-2286.

Hui Zhang et al., A Multilevel Converter Topology With Common Flying Capacitors, IEEE Energy Conversion Congress and Exposition, Sep. 15, 2013, pp. 1274-1280.

Isamu Hasagawa et al., Voltage Control of Common Flying Capacitors in 5-Level Converter With Capacitor Current Estimation, $17^{th}$ European Conference on Power Electronics and Applications, Jointly Owned by EPE Association and IEEE PELS, Sep. 8, 2015, pp. 1-10.

Extended European Search Report, dated Jan. 20, 2017, 11 pages.

(a)

(b)

MULTILEVEL POWER CONVERTOR

TECHNICAL FIELD

The present invention relates to a multilevel power convertor for high voltage and large capacity.

BACKGROUND ART

A power convertor is configured by main circuit switching elements which are semiconductor elements (a module formed by a semiconductor switching element such as IGBT and a diode which is connected in reversely parallel to the semiconductor switching element; this is the same in the following description). As means for generating a high voltage in the power convertor, there is a circuit configuration in which a plurality of semiconductor elements are connected in series to each other.

A multilevel power convertor, like the above power convertor, which outputs five-level voltages in the circuit configuration in which the plurality of semiconductor elements are connected in series to each other, has been proposed. As one of configurations of the multilevel power convertor, a circuit configuration as disclosed in PATENT DOCUMENT 1 has been proposed. In PATENT DOCUMENT 1, as illustrated in FIG. 27 of the present application, DC voltage sources DCC1 and DCC2, and flying capacitors FC1 and FC2 are in common to three phases, and thus the number of capacitors used in the multilevel power convertor can be reduced, thereby allowing size reduction of the device.

CITATION LIST

Patent Literature

[PATENT DOCUMENT 1] Japanese Patent Application No. 2012-209368

SUMMARY OF INVENTION

However, in the circuit configuration illustrated in FIG. 27, since capacitors and some semiconductor elements S1 to S4 are in common to three phases, as a problem, a combination of output voltages which cannot be outputted is present. Specifically, when attempting to output phase voltages of 2E, 0 and −2E from output terminals U, V and W respectively, since the flying capacitor FC1 is short-circuited, it is impossible to output a combination of these phase voltages.

A specific example will be described with reference to FIG. 28. Here, FIG. 28 illustrates an example in which a U phase outputs a voltage of 2E, a V phase outputs a voltage of 0, and a W phase outputs a voltage of −2E. In addition, in FIG. 28, a circular mark indicates a turned-on semiconductor element.

As illustrated in FIG. 28, when attempting to simultaneously output the voltages of 2E, 0 and −2E from the output terminals U, V and W respectively, semiconductor elements S1 and S2 at both ends of a flying capacitor FC1 are simultaneously turned on, and thus the flying capacitor FC1 is short-circuited. As a result, an overcurrent flows through a short-circuited loop of DCC1→S1→FC1→S2→DCC1.

Because of this problem, in the case of the circuit configuration illustrated in FIG. 27, it is impossible to select the semiconductor element that is turned-on as illustrated in FIG. 28, and thus the voltages of 2E, 0, and −2E are cannot be simultaneously output.

In the case of the circuit configuration illustrated in FIG. 27, since the voltages of 2E, 0 and −2E cannot be simultaneously outputted from the output terminals U, V and W respectively, these outputs are replaced with a combination of other output voltages as an alternative method. For example, as the alternative method, by repeatedly outputting voltages of 2E, E and −2E and voltages of 2E, −E and −2E from the output terminals U, V and W respectively then outputting each average voltage of 2E, 0 and −2E, the voltages of 2E, 0 and −2E are replaced with the respective average voltages.

However, it is required, all the time, to equalize times for which voltages of 2E, E and −2E, and voltages of 2E, −E and −2E are outputted from the output terminals U, V and W respectively, and also time management is required all the time. As a result, this causes a problem of complicating the control. This problem also occurs in a case of a circuit configuration in which the number of output phases is increased to four or greater, using FIG. 27.

On the other hand, in [Embodiment 5] of PATENT DOCUMENT 1 illustrated in FIG. 29($a$) of the present application and [Embodiment 6] of PATENT DOCUMENT 1 illustrated in FIG. 29($b$) of the present application, in a case where an application voltage of each of DC voltage sources DCC1 and DCC2 is 2E and an application voltage of each of flying capacitors CFC1 and CFC2 is E, voltages of 2E, 0 and −2E can be simultaneously output from output terminals OUT_U, OUT_V and OUT_W respectively. However, the following problems (1) and (2) occur in the circuit configurations illustrated in FIGS. 29($a$) and 29($b$).

(1) In the circuit configurations illustrated in FIGS. 29($a$) and 29($b$), a steady voltage maximum value which is applied to semiconductor elements SU5, SU6, SV5, SV6, SW5 and SW6 connected to the output terminals OUT_U, OUT_V and OUT_W is 3E. A semiconductor element with high withstand voltage is consequently necessary, and as a problem, this has a disadvantage in size reduction of the device and in cost of the device.

(2) Since currents of three phases of the U phase, the V phase and the W phase flow through semiconductor elements S2.1 to S2.3, and S1.1 to S1.3 that are shown by circular marks in FIGS. 29($a$) and 29($b$), a large-sized cooling fin with a high cooling effect is required to cool these semiconductor elements S2.1 to S2.3, and S1.1 to S1.3.

The above problems (1) and (2) also occur in a circuit configuration in which the number of output phases is increased to four or greater by employing FIGS. 29($a$) and 29($b$).

In view of the foregoing, an object of the present invention is to output an arbitrary voltage from all phases and to simplify a control for outputting an arbitrary voltage level from the all phases in a multiphase and multilevel power convertor.

The present invention was made in view of the above problem. According to one aspect of the present invention, a multilevel power convertor that generates AC outputs with a plurality of voltage levels obtained by conversion of voltages of a DC voltage source and a flying capacitor, comprises: N DC voltage sources (N≥2) that are connected in series to each other; basic circuits of M phases (M≥3), each of which includes first to fourth semiconductor elements that are sequentially connected in series between positive and negative electrodes of each of the N DC voltage sources; a fifth semiconductor element whose one end is connected to a common connection point of the first and second semiconductor elements; and a sixth semiconductor element whose one end is connected to a common connection point of the third and fourth semiconductor elements; a flying capacitor that is inserted between the other ends of the fifth semiconductor elements of all the phases and the other ends of the sixth semiconductor elements of all the phases, the flying capacitor being in common to the M phases; and voltage selection circuits of the M phases, each of which has common connection points of the second and third semiconductor elements of each basic circuit as input terminals, includes semiconductor elements between the input terminals and an output terminal, and outputs a potential of any one of the input terminals from the output terminal by selectively controlling ON/OFF of the semiconductor elements.

According to another aspect of the present invention, A multilevel power convertor that generates AC outputs with a plurality of voltage levels obtained by conversion of voltages of a DC voltage source and a flying capacitor, comprises: N DC voltage sources (N=an even number of 2 or greater) that are connected in series to each other; basic circuits that include a first semiconductor element whose one end is connected to a positive electrode end of a DC voltage source in an even-numbered stage of the N serially connected DC voltage sources, the first semiconductor element being in common to M phases (M≥3); second to fourth semiconductor elements of the M phases which are sequentially connected in series between the other end of the first semiconductor element in the even-numbered stage and a negative electrode end of the DC voltage source in the even-numbered stage; sixth semiconductor elements of the M phases whose one ends are connected to common connection points of the third and fourth semiconductor elements in the even-numbered stage; a fourth semiconductor element whose one end is connected to a negative electrode end of a DC voltage source in an odd-numbered stage, the fourth semiconductor element being in common to the M phases; first to third semiconductor elements of the M phases which are sequentially connected in series between a positive electrode end of the DC voltage source in the odd-numbered stage and the other end of the fourth semiconductor element in the odd-numbered stage; and fifth semiconductor elements of the M phases whose one ends are connected to common connection points of the first and second semiconductor elements in the odd-numbered stage; a flying capacitor in the even-numbered stage that is inserted between a common connection point of the first and second semiconductor elements in the even-numbered stage and the other ends of the sixth semiconductor elements of all the phases in the even-numbered stage, the flying capacitor being in common to the M phases; a flying capacitor in the odd-numbered stage that is inserted between the other ends of the fifth semiconductor elements of all the phases in the odd-numbered stage and a common connection point of the third and fourth semiconductor elements in the odd-numbered stage, the flying capacitor being in common to the M phases; and voltage selection circuits of the M phases, each of which has common connection points of the second and third semiconductor elements of each basic circuit as input terminals, includes semiconductor elements between the input terminals and an output terminal, and outputs a potential of any one of the input terminals from the output terminal by selectively controlling ON/OFF of the semiconductor elements.

In addition, according to still aspect of the present invention, a multilevel power convertor that generates AC outputs with a plurality of voltage levels obtained by conversion of voltages of a DC voltage source and a flying capacitor, comprises: N DC voltage sources (N an even number of 2 or greater) that are connected in series to each other; basic circuits that include a fourth semiconductor element whose one end is connected to a negative electrode end of a DC voltage source in an even-numbered stage of the N serially connected DC voltage sources, the fourth semiconductor element being in common to M phases (where M≥3); first to third semiconductor elements of the M phases which are sequentially connected in series between a positive electrode end of the DC voltage source in the even-numbered stage and the other end of the fourth semiconductor element in the even-numbered stage; fifth semiconductor elements of the M phases whose one ends are connected to common connection points of the first and second semiconductor elements in the even-numbered stage; a first semiconductor element whose one end is connected to a positive electrode end of a DC voltage source in an odd-numbered stage, the first semiconductor element being in common to the M phases; second to fourth semiconductor elements of the M phases which are sequentially connected in series between the other end of the first semiconductor element in the odd-numbered stage and a negative electrode end of the DC voltage source in the odd-numbered stage; and sixth semiconductor elements of the M phases whose one ends are connected to common connection points of the third and fourth semiconductor elements in the odd-numbered stage; a flying capacitor in the even-numbered stage that is inserted between all the fifth semiconductor elements and a common connection point of the third and fourth semiconductor elements in the even-numbered stage, the flying capacitor being in common to the M phases; a flying capacitor in the odd-numbered stage that is inserted between a common connection point of the first and second semiconductor elements and all the sixth semiconductor elements in the odd-numbered stage, the flying capacitor being in common to the M phases; and voltage selection circuits of the M phases, each of which has common connection points of the second and third semiconductor elements of each basic circuit as input terminals, includes semiconductor elements between the input terminals and an output terminal, and outputs a potential of any one of the input terminals from the output terminal by selectively controlling ON/OFF of the semiconductor elements.

Further, according to still further aspect of the present invention, a multilevel power convertor that generates AC outputs with a plurality of voltage levels obtained by conversion of voltages of a DC voltage source and a flying capacitor, comprises: N DC voltage sources (N=an even number of 2 or greater) that are connected in series to each other; basic circuits of M phases (M≥3), each of which includes second and third semiconductor elements which are sequentially connected in series to a positive electrode end of a DC voltage source in an even-numbered stage of the N serially connected DC voltage sources; and third and second semiconductor elements which are sequentially connected in series to a negative electrode end of a DC voltage source in the odd-numbered stage of the N serially connected DC voltage sources; a flying capacitor that is connected parallel to the second and third semiconductor elements in each of the even-numbered stage and odd-numbered stage, the flying capacitor being in common to the M phases; and voltage selection circuits of the M phases, each of which has common connection points of the second and third semiconductor elements of each basic circuit and a common connection point of a negative electrode end of the DC voltage source in the even-numbered stage and a positive electrode end of the DC voltage source in the odd-numbered stage as input terminals, includes semiconductor elements between the input terminals and an output terminal, and outputs a potential of any one of the input terminals from the output terminal by selectively controlling ON/OFF of the semiconductor elements.

According to still further aspect of the present invention, a multilevel power convertor that generates AC outputs with a plurality of voltage levels obtained by conversion of voltages of a DC voltage source and a flying capacitor, comprises: N DC voltage sources (N=an even number of 2 or greater) that are connected in series to each other; basic circuits of M phases (M≥3), each of which includes second to fourth semiconductor elements which are sequentially connected in series between positive and negative electrode ends of a DC voltage source in an even-numbered stage of the N serially connected DC voltage sources; a sixth semiconductor element whose one end is connected to a common connection point of the third and fourth semiconductor elements in the even-numbered stage; first to third semiconductor elements which are sequentially connected in series between positive and negative electrode ends of a DC voltage source in an odd-numbered stage of the N serially connected DC voltage sources; and a fifth semiconductor element whose one end is connected to a common connection point of the first and second semiconductor elements in the odd-numbered stage; a flying capacitor in the even-numbered stage that is inserted between the other ends of all the sixth semiconductor elements in the even-numbered stage and a common connection point of a positive electrode end of the DC voltage source and the second semiconductor element in the even-numbered stage, the flying capacitor being in common to the M phases; a flying capacitor in the odd-numbered stage that is inserted between the other ends of all the fifth semiconductor elements in the odd-numbered stage and a common connection point of a negative electrode end of the DC voltage source and the third semiconductor element in the odd-numbered stage, the flying capacitor being in common to the M phases; and voltage selection circuits of the M phases, each of which has common connection points of the second and third semiconductor elements of each basic circuit as input terminals, includes semiconductor elements between the input terminals and an output terminal, and outputs a potential of any one of the input terminals from the output terminal by selectively controlling ON/OFF of the semiconductor elements.

In addition, according to still further aspect of the present invention, a multilevel power convertor that generates AC outputs with a plurality of voltage levels obtained by conversion of voltages of a DC voltage source and a flying capacitor, comprises: N DC voltage sources (N=an even number of 2 or greater) that are connected in series to each other; basic circuits of M phases (M≥3), each of which includes first to third semiconductor elements which are sequentially connected in series between positive and negative electrode ends of a DC voltage source in an even-numbered stage of the N serially connected DC voltage sources; a fifth semiconductor element whose one end is connected to a common connection point of the first and second semiconductor elements in the even-numbered stage; second to fourth semiconductor elements which are sequentially connected in series between positive and negative electrode ends of a DC voltage source in an odd-numbered stage of the N serially connected DC voltage sources; and a sixth semiconductor element whose one end is connected to a common connection point of the third and fourth semiconductor elements in the odd-numbered stage; a flying capacitor in the even-numbered stage that is inserted between the other ends of all the fifth semiconductor elements in the even-numbered stage and a common connection point of a negative electrode end of the DC voltage source and the third semiconductor element in the even-numbered stage, the flying capacitor being in common to the M phases; a flying capacitor in the odd-numbered stage that is inserted between the other ends of all the sixth semiconductor elements in the odd-numbered stage and a common connection point of a positive electrode end of the DC voltage source and the second semiconductor element in the odd-numbered stage, the flying capacitor being in common to the M phases; and voltage selection circuits of the M phases, each of which has common connection points of the second and third semiconductor elements of each basic circuit as input terminals, includes semiconductor elements between the input terminals and an output terminal, and outputs a potential of any one of the input terminals from the output terminal by selectively controlling ON/OFF of the semiconductor elements.

Further, the number of series-connection of all or some of the semiconductor elements in the basic circuits and the voltage selection circuits could be equal to or greater than 2.

Furthermore, the number of parallel-connection of all or some of the semiconductor elements in the basic circuits and the voltage selection circuits could be equal to or greater than 2.

According to the present invention, it is possible to output the arbitrary voltage from all phases and to simplify the control for outputting the arbitrary voltage level from the all phases in the multiphase and multilevel power convertor.

DESCRIPTION OF EMBODIMENTS

[Basic Cell]

Figure 1:
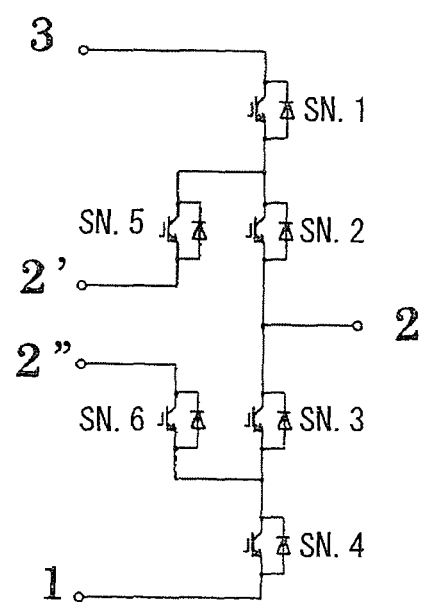
FIG. 1 is a diagram illustrating a basic cell.

FIG. 1 is a circuit diagram illustrating a basic cell used in a multilevel power convertor according to the present invention. The basic cell is configured by six semiconductor elements SN.1 to SN.6 (for example, a module formed by a semiconductor switching element such as IGBT and a diode which is connected in reversely parallel to the semiconductor switching element; this is the same in the following description).

More specifically, as illustrated in FIG. 1, a terminal 3 is connected to a positive electrode side of a DC voltage source (a DC capacitor or a DC power source), and a terminal 1 is connected to a negative electrode side of the DC voltage source. In addition, a terminal 2' is connected to a positive electrode side of a flying capacitor (or the DC voltage source), and a terminal 2" is connected to a negative electrode side of the flying capacitor.

The semiconductor elements SN.1 to SN.4 are sequentially connected in series between the terminal 3 and the terminal 1. In addition, a semiconductor element SN.5 is inserted between the terminal 2' and a common connection point of the semiconductor elements SN.1 and SN.2. A semiconductor element SN.6 is inserted between the terminal 2" and a common connection point of the semiconductor elements SN.3 and SN.4. Here, a common connection point of the semiconductor elements SN.2 and SN.3 is the terminal 2.

[Basic Circuit]

Figure 2:
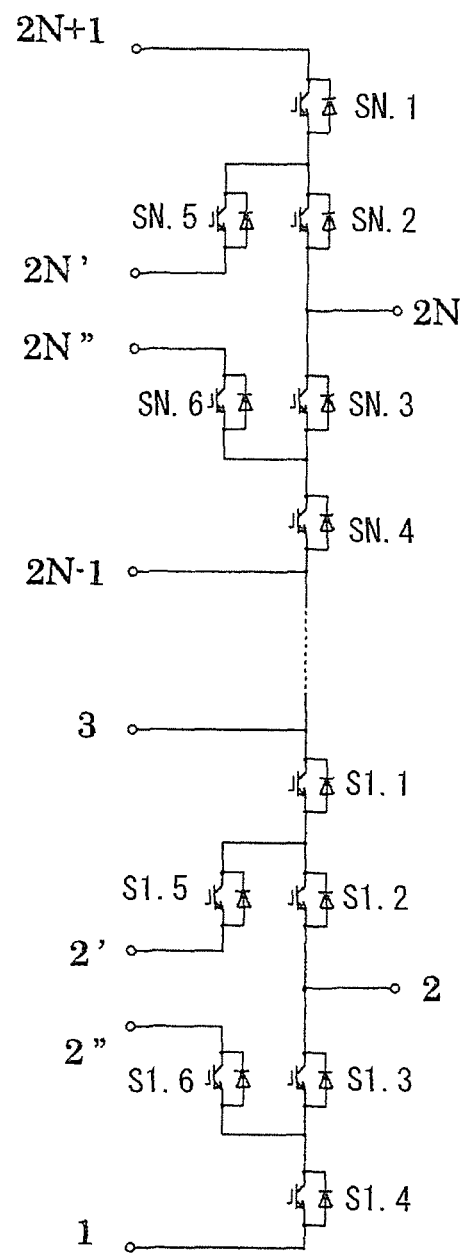
FIG. 2 is a diagram illustrating a basic circuit in which N basic cells are connected in series to each other.

FIG. 2 illustrates a basic circuit in which N basic cells illustrated in FIG. 1 are connected in series to each other. Here, N is equal to or greater than 2 (N≥2).

A DC voltage source is connected between terminal numbers 2N+1 and 2N−1. A flying capacitor is connected between terminal numbers 2N' and 2N". Here, when a voltage of the DC voltage source is 2E and a voltage of each flying capacitor is E, in a configuration in which the basic cells of N stages are connected in series to each other, a terminal 2*n* can output voltages of "2En, 2En−E, or 2En−2E" (where n=1 to N).

By connecting a voltage selection circuit for selecting a voltage to each of the terminal 2N, the terminal 2(N−1), ... and the terminal 2, a (2N+1)-level power convertor can be achieved.

[Voltage Selection Circuit]

Figure 3:
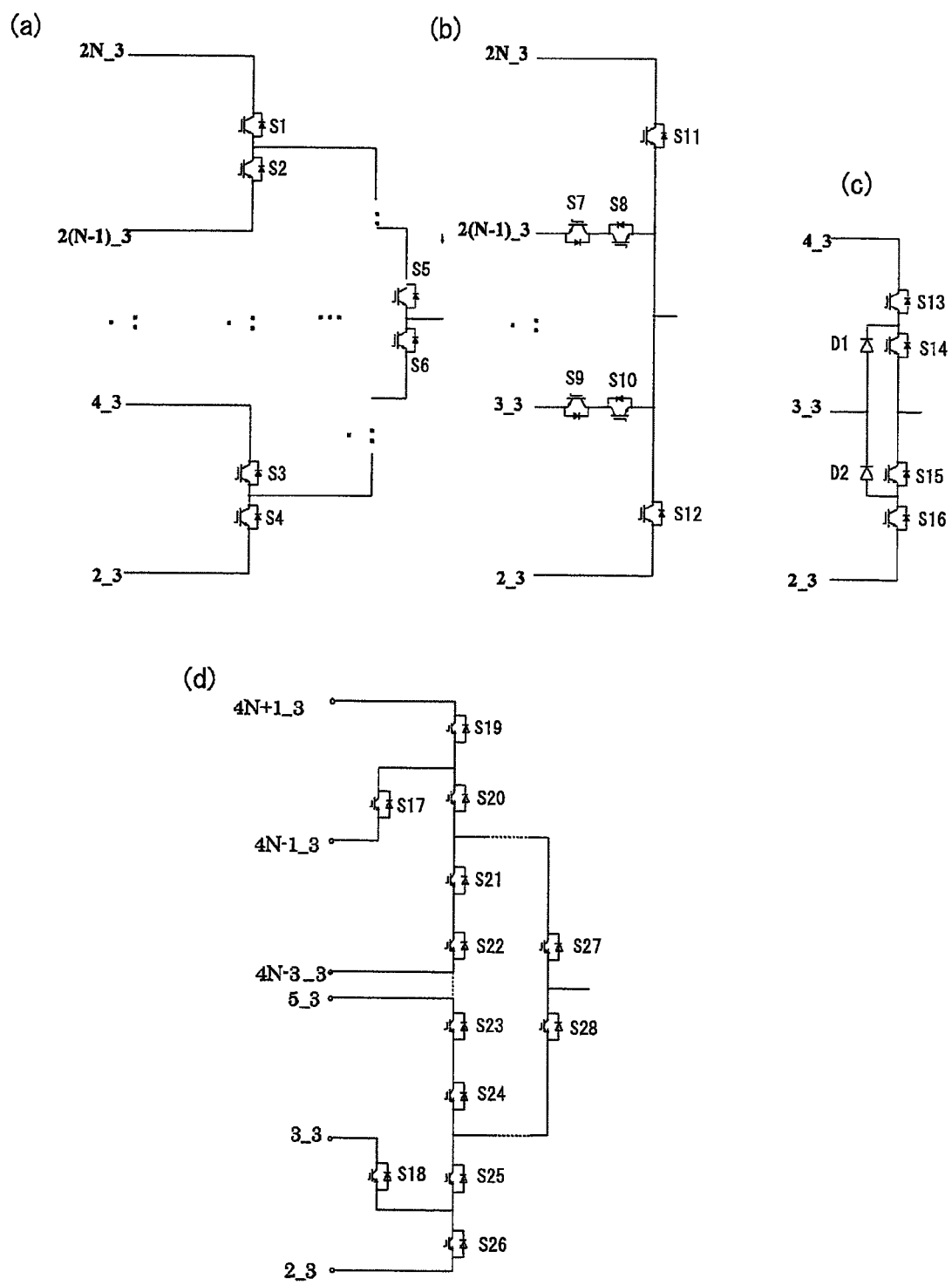
FIG. 3 shows circuit configuration diagrams illustrating voltage selection circuits.

Next, the voltage selection circuit will be explained with reference to FIG. 3. The voltage selection circuit is a circuit that has input terminals corresponding to the terminals (2, ..., and 2N) of the basic circuit and selects one of potentials of the input terminals as an output potential which is outputted from an output terminal. The voltage selection circuit is configured by a configuration illustrated in FIG. 3(*a*), 3(*b*), 3(*c*) or 3(*d*), or a combination thereof. Semiconductor elements S1 to S28 are provided between each input terminal and the output terminal. By selectively turning on the semiconductor elements S1 to S28, a potential of one of the input terminals (in FIG. 3(*a*), 2N_3, 2(N−1)_3, 4_3, and 2_3, in FIG. 3(*b*), 2N_3, 2(N_1)_3, 3_3, and 2_3, in FIG. 3(*c*), 4_3, 3_3, 2_3, and in FIG. 3(*d*), 4N+1_3, 4_N−1_3, 4_N−3_3, 5_3, 3_3, and 2_3) can be outputted.

Embodiment 1

Figure 4:
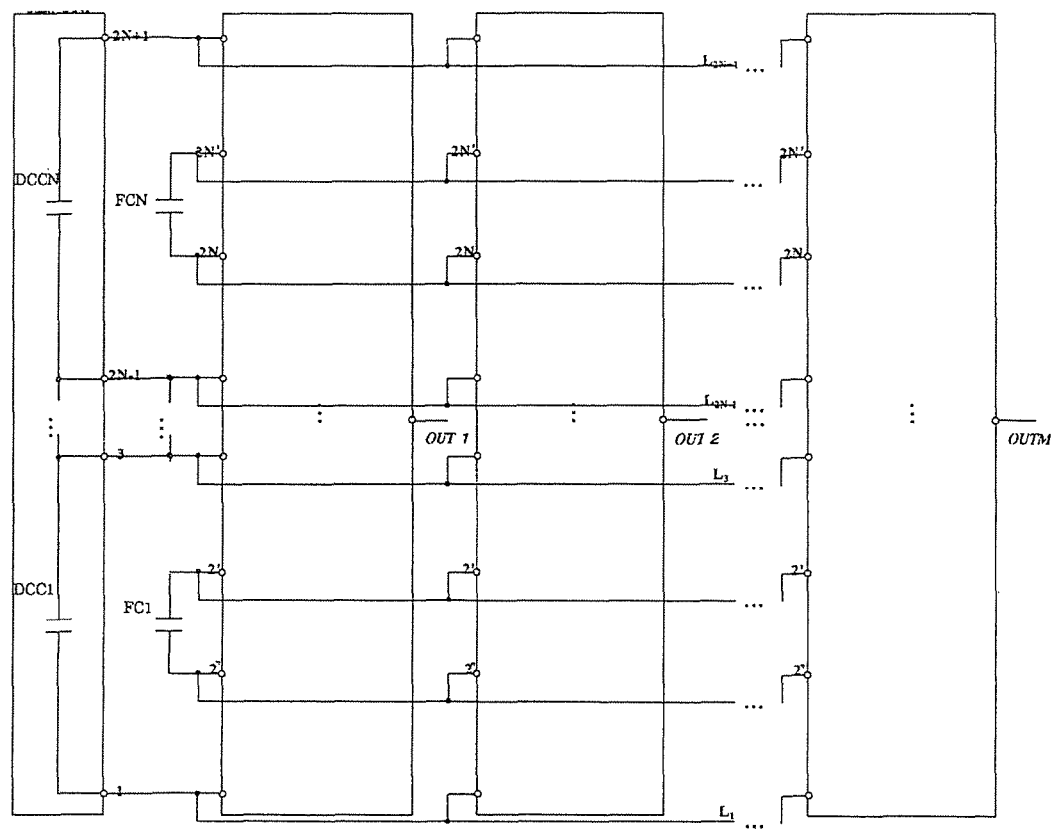
FIG. 4 is a diagram illustrating a multilevel power convertor in Embodiment 1.

FIG. 4 is a schematic diagram illustrating a configuration of a multilevel power convertor in Embodiment 1. As illustrated in FIG. 4, the multilevel power convertor in Embodiment 1 is an M-phase and N-stage multilevel power convertor configured using the basic circuit illustrated in FIG. 2 and the voltage selection circuit illustrated in FIG. 3. Here, N≥2, and M≥3.

Each of phase modules 11 to 1M is configured by a combination of the basic circuit and the voltage selection circuit. Configurations of the basic circuit and the voltage selection circuit are the same as those illustrated in FIGS. 2 and 3, and thus description thereof will be omitted here. N DC voltage sources DCC1 to DCCN are connected in series between both end terminals 1 and 2N+1 of the phase modules 11 to 1M. Common connection points of the DC voltage sources DCC1 to DCCN are respectively connected to terminals 3, ..., and 2N−1 of the phase modules 11 to 1M (the basic circuits). In addition, N flying capacitors FC1 to FCN are respectively connected to terminals 2", 2', ..., 2N" and 2N' of the phase modules 11 to 1M.

Here, when a voltage of each of the DC voltage sources DCC1 to DCCN is 2E and each voltage of the flying capacitors FC1 to FCN is controlled to E, it is possible to output voltages of (2*p*−2)E and (2*p*−1)E from a terminal 2*p*" (where p=1, 2, ..., and N). Further, it is possible to output voltages of (2*p*−1)E and 2*p*E from a terminal 2*p*'. In addition, a voltage of (2*p*−2)E can be outputted from a terminal 2*p*−1, and a voltage of 2*p*E can be outputted from a terminal 2*p*+1.

Next, potentials of the terminals 1, 2", 2', and 3, ..., and 2N−1, 2N", 2N' and 2N+1 are inputted to the phase modules 11 to 1M. Then, in the basic circuit, by selectively turning on the semiconductor elements S1.1, S1.2, S1.3, and S1.4 to SN.1, SN.2, SN.3 and SN.4 for the each stage, one of the potentials of the terminals 1, 2", 2', and 3, ..., and 2N−1, 2N", 2N' and 2N+1 is outputted from each of the terminals 2, ..., and 2N. Further, by selectively turning on the semiconductor elements of the basic circuit of each stage by the voltage selection circuit, one of the potentials of the terminals 2, . . . , and 2N is outputted from each of output terminals OUT1 to OUTM. As a result, voltages of (2N+1) levels can be output from the output terminals OUT1 to OUTM.

As described above, according to Embodiment 1, operations and effects of the following (1) and (2) are achieved and obtained.

Figure 27:
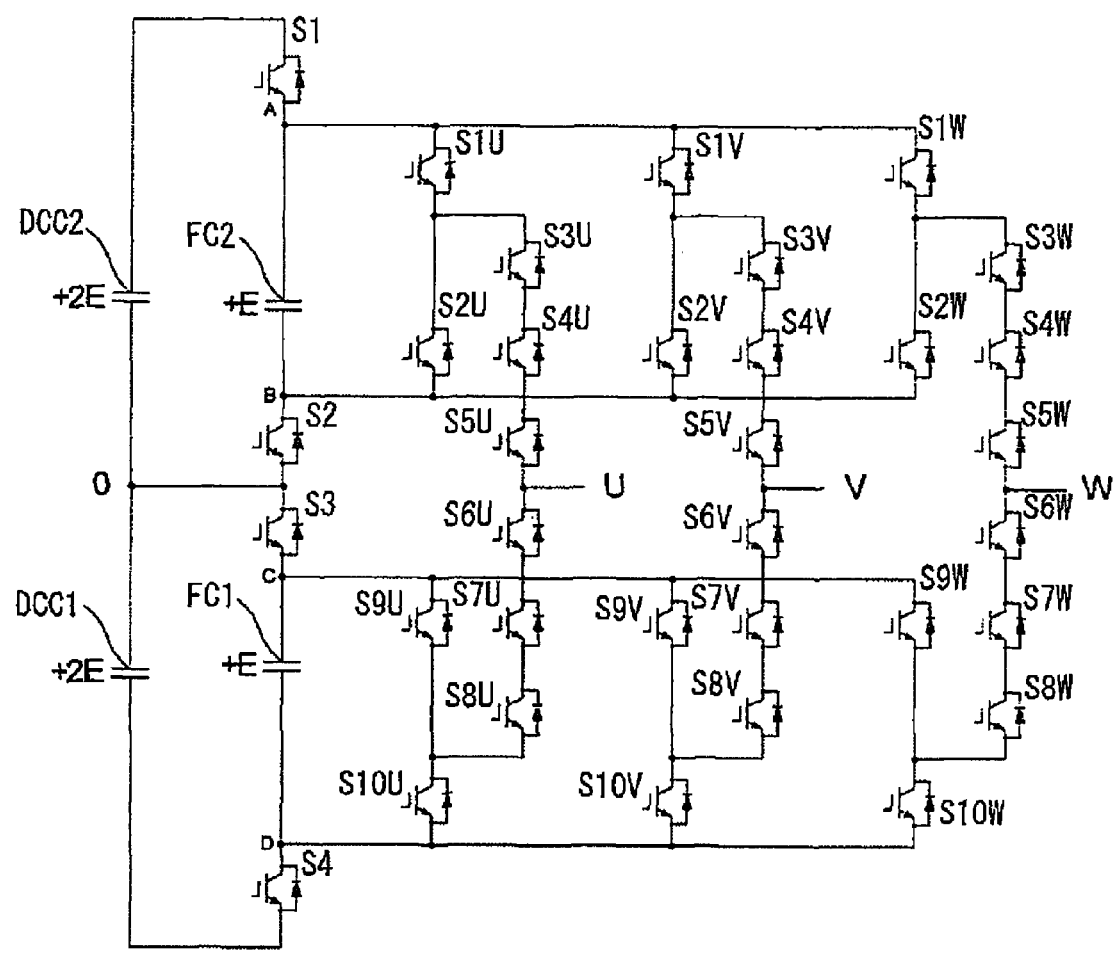
FIG. 27 is a circuit configuration diagram illustrating an example of a multilevel power convertor of the related art.
Figure 28:
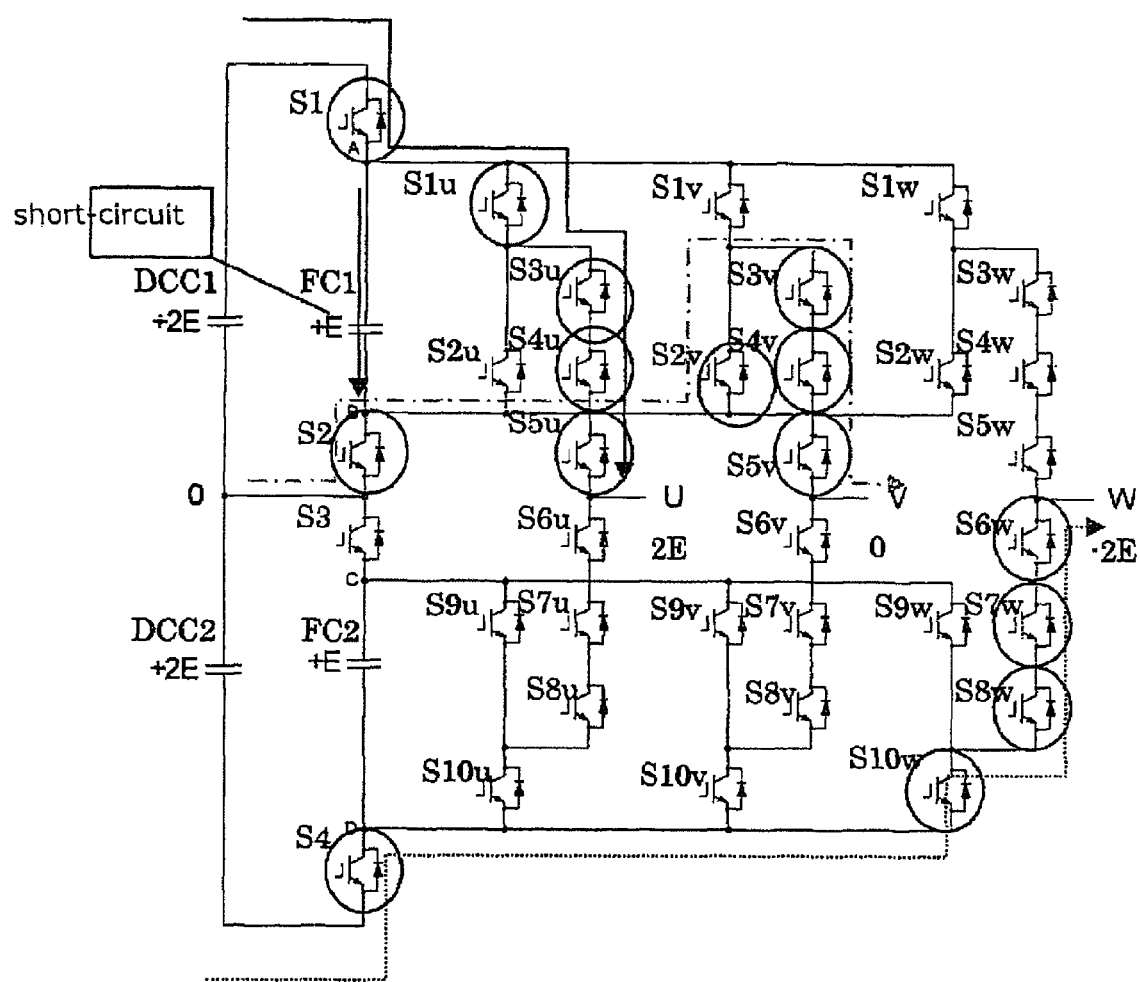
FIG. 28 is an explanatory diagram explaining an output voltage which cannot be output by the multilevel power convertor of the related art.

(1) When compared with the circuit configuration of the related art illustrated in FIG. 27, an arbitrary phase voltage level can be output, and control for outputting the arbitrary phase voltage level is facilitated.

Figure 29:
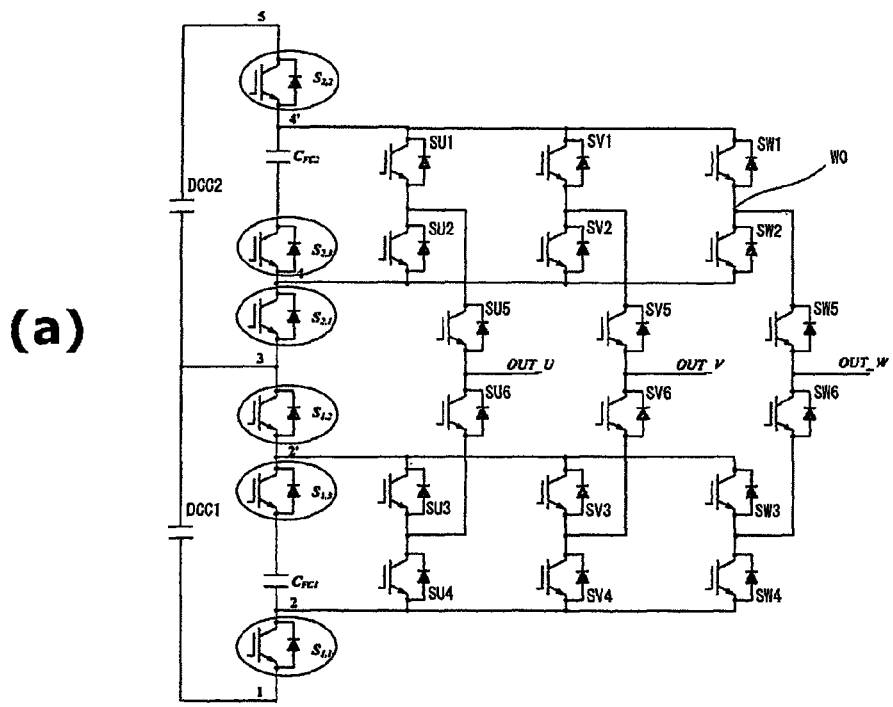
FIG. 29 shows circuit configuration diagrams illustrating other examples of multilevel power convertors of the related art.
Figure 29:
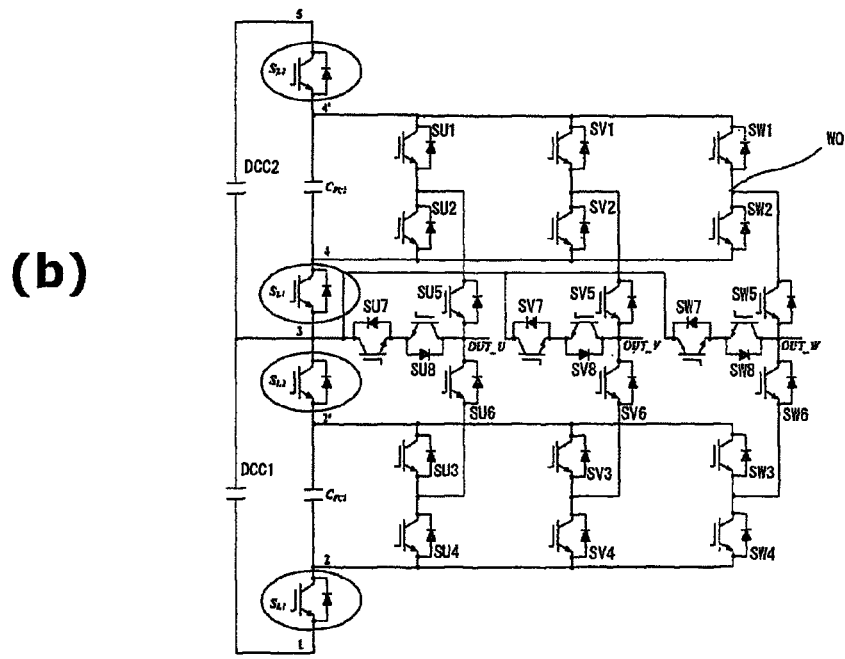

(2) Unlike the circuit configuration of the related art illustrated in FIGS. 29(a) and 29(b), there is no semiconductor element through which three-phase output currents of the U phase, the V phase, and the W phase flow then which has high power loss, it is possible to achieve size reduction of a cooling fin for cooling the semiconductor element.

Embodiment 2

Figure 5:
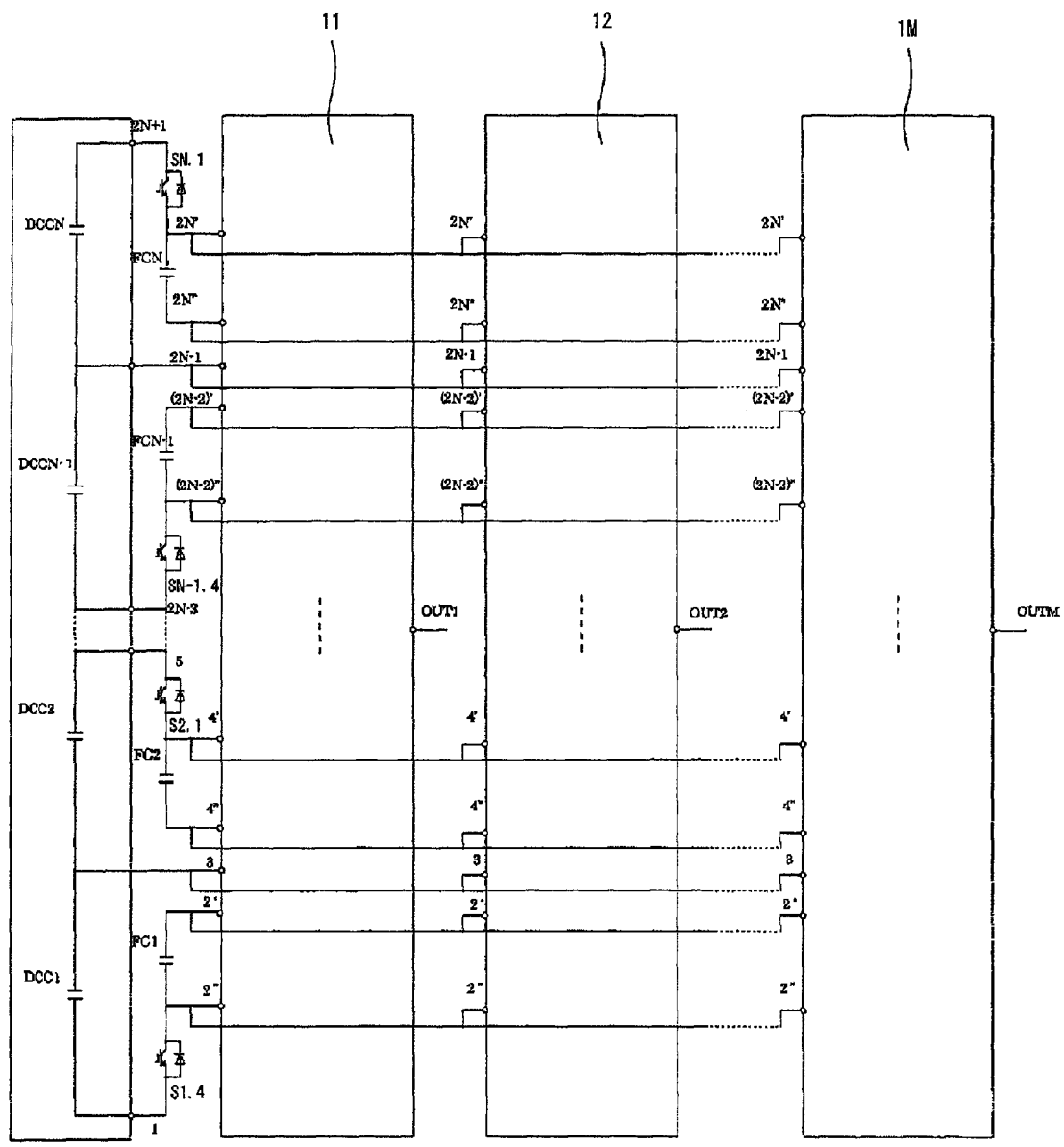
FIG. 5 is a diagram illustrating a multilevel power convertor in Embodiment 2.

Next, a multilevel power convertor in Embodiment 2 will be explained with reference to FIG. 5. The multilevel power convertor in Embodiment 2 has a configuration where a circuit in which the first semiconductor elements S2.1 to SN.1 are in common to M phases and the fifth semiconductor elements S2.5 to SN.5 are omitted (removed) in the basic cells in the even-numbered stages of the basic circuit illustrated in FIG. 2 and a circuit in which fourth semiconductor elements S1.4 to SN-1.4 are in common to the M phases and the sixth semiconductor elements S1.6 to SN-1.6 are omitted (removed) in the basic cells in the odd-numbered stages of the basic circuit are connected to each other in N stages. Here, the multilevel power convertor in Embodiment 2 is an M-phase and N-stage multilevel power convertor. N is an even number of 2 or greater, and M≥3. Other configurations are the same as those in Embodiment 1.

In the configuration of Embodiment 2, it is possible to output voltages with (2N+1) levels from the output terminals OUT1 to OUTM. According to the multilevel power convertor in Embodiment 2, when compared with the circuit configuration of the related art illustrated in FIG. 27, an arbitrary phase voltage level can be output, and control for outputting the arbitrary phase voltage level is facilitated. In addition, when compared with Embodiment 1, the number of semiconductor elements can be reduced.

Embodiment 3

Figure 6:
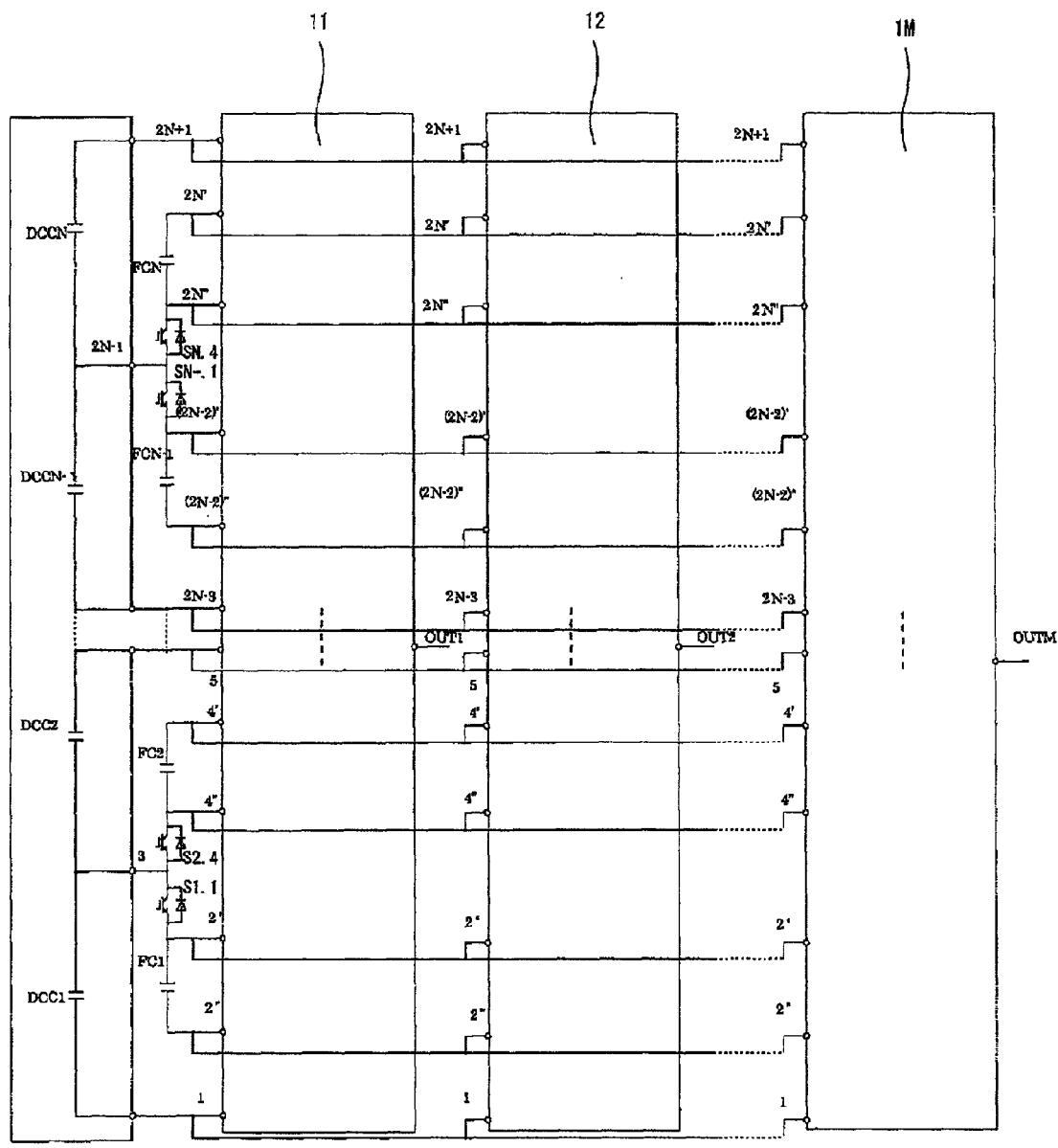
FIG. 6 is a diagram illustrating a multilevel power convertor in Embodiment 3.

Next, a multilevel power convertor in Embodiment 3 will be explained with reference to FIG. 6. The multilevel power convertor in Embodiment 3 has a configuration where a circuit in which fourth semiconductor elements S2.4 to SN.4 are in common to M phases and the sixth semiconductor elements S2.6 to SN.6 are omitted in the basic cells in the odd-numbered stages of the basic circuit illustrated in FIG. 2 and a circuit in which the first semiconductor elements S1.1 to SN-1.1 are in common to M phases and the fifth semiconductor elements S1.5 to SN-1.5 are omitted in the basic cells in the even-numbered stages of the basic circuit are connected to each other in N stages. Here, the multilevel power convertor in Embodiment 3 is an M-phase and N-stage multilevel power convertor. N is an even number of 2 or greater, and M≥3. Other configurations are the same as those in Embodiment 1.

In the configuration of Embodiment 3, it is possible to output voltages with (2N+1) levels from the output terminals OUT1 to OUTM.

According to the multilevel power convertor in Embodiment 3, the same operations and the effects as in Embodiment 2 are achieved and obtained.

Embodiment 4

Figure 7:
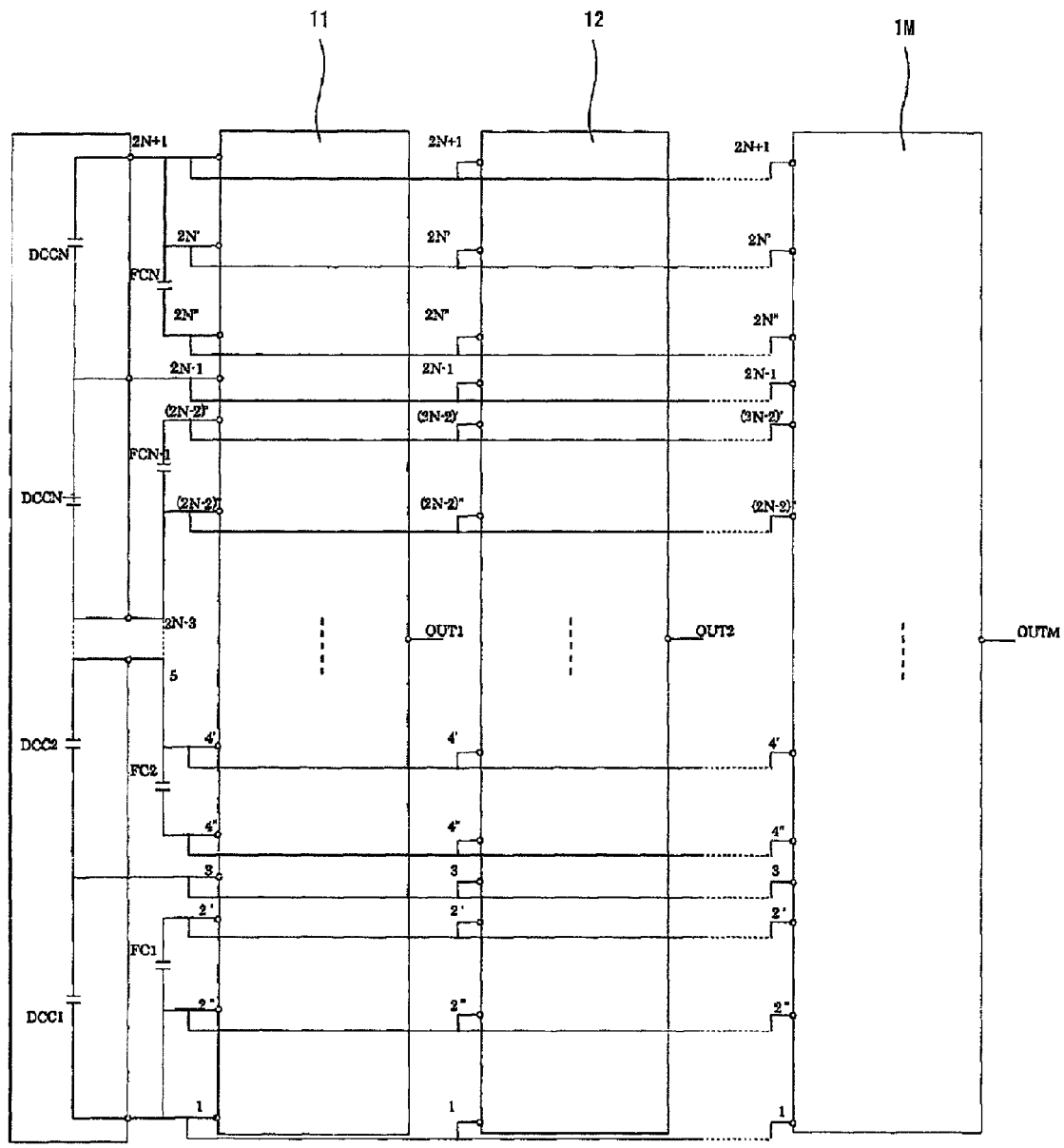
FIG. 7 is a diagram illustrating a multilevel power convertor in Embodiment 4.

Next, a multilevel power convertor in Embodiment 4 will be explained with reference to FIG. 7. In Embodiment 4, the first semiconductor elements S2.1 to SN.1 of the basic cells in the even-numbered stages which are in common to M phases, and the fourth semiconductor elements S1.4 to SN-1.4 of the basic cells in the odd-numbered stages which are in common to the M phases, are omitted (removed) in the multilevel power convertor of Embodiment 2. That is, in FIG. 7, the semiconductor elements connected to the terminals 1, 5, 2N−3 and 2N+1, are omitted (removed). Other configurations are the same as those in Embodiment 2. Here, N is an even number of 2 or greater, and M≥3.

In the configuration related to Embodiment 4, it is possible to output voltages with (2N+1) levels from the output terminals OUT1 to OUTM.

According to the multilevel power convertor in Embodiment 4, when compared with the circuit configuration of the related art illustrated in FIG. 27, an arbitrary phase voltage level can be output, and control for outputting the arbitrary phase voltage level is facilitated.

Unlike the circuit configuration of the related art illustrated in FIGS. 29(a) and 29(b), there is no semiconductor element through which three-phase output currents of the U phase, the V phase, and the W phase flow then which has high power loss, it is possible to achieve size reduction of a cooling fin for cooling the semiconductor element.

In addition, when compared with Embodiment 2, the number of semiconductor elements can be reduced.

Embodiment 5

Figure 8:
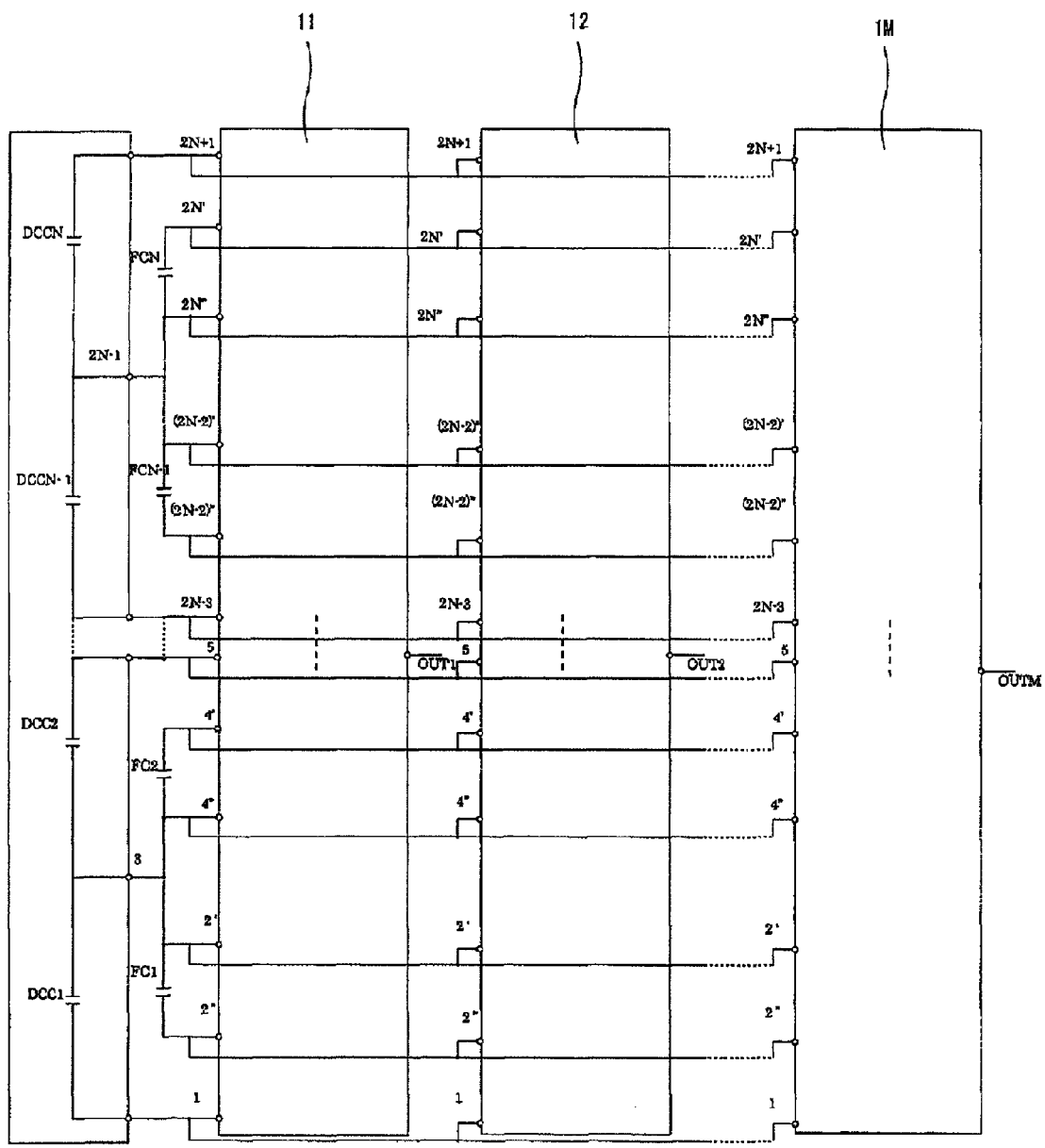
FIG. 8 is a diagram illustrating a multilevel power convertor in Embodiment 5.

Next, a multilevel power convertor in Embodiment 5 will be explained with reference to FIG. 8. In Embodiment 5, the fourth semiconductor elements S2.4 to SN.4 of the basic cells in the even-numbered stages which are in common to M phases, and the first semiconductor elements S1.1 to SN-1.1 of the basic cells in the odd-numbered stages which are in common to the M phases, are omitted (removed) in the multilevel power convertor of Embodiment 3. That is, in FIG. 8, the semiconductor elements connected to the terminals 3 and 2N−1 are omitted (removed). Other configurations are the same as those in Embodiment 3. Here, N is an even number of 2 or greater, and M≥3.

In the configuration related to Embodiment 5, it is possible to output voltages with (2N+1) levels from the output terminals OUT1 to OUTM.

According to the multilevel power convertor in Embodiment 5, when compared with the circuit configuration of the related art illustrated in FIG. 27, an arbitrary phase voltage level can be output, and control for outputting the arbitrary phase voltage level is facilitated.

Unlike the circuit configuration of the related art illustrated in FIGS. 29(a) and 29(b), there is no semiconductor element through which three-phase output currents of the U phase, the V phase, and the W phase flow then which has high power loss, it is possible to achieve size reduction of a cooling fin for cooling the semiconductor element.

In addition, when compared with Embodiment 3, the number of semiconductor elements can be reduced.

Embodiment 6

Figure 9:
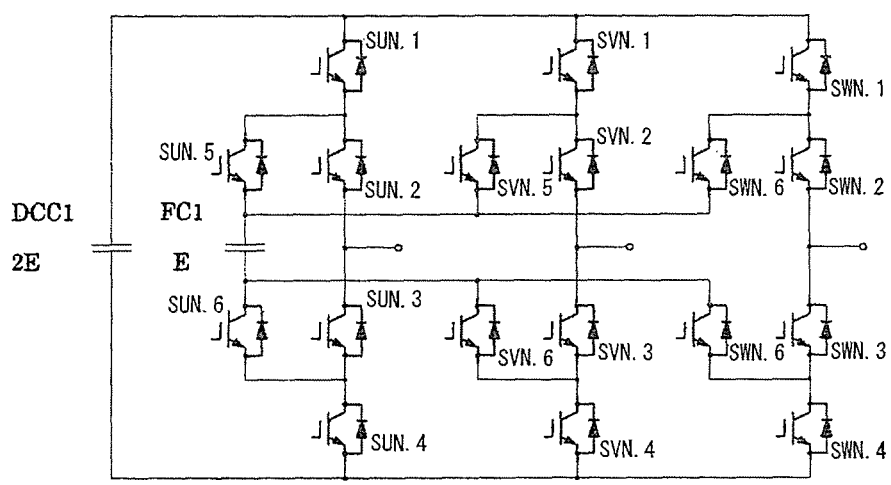
FIG. 9 is a circuit configuration diagram illustrating a basic cell in Embodiment 6.

FIG. 9 illustrates a basic cell obtained in a case where N=1 and M=3 in Embodiment 1. The basic cell is configured by a DC voltage source DCC1, a flying capacitor FC1, semiconductor elements SUN.1 to SUN.6 of a U phase, a semiconductor elements SVN.1 to SVN.6 of a V phase, and a semiconductor elements SWN.1 to SWN.6 of a W phase.

Figure 10:
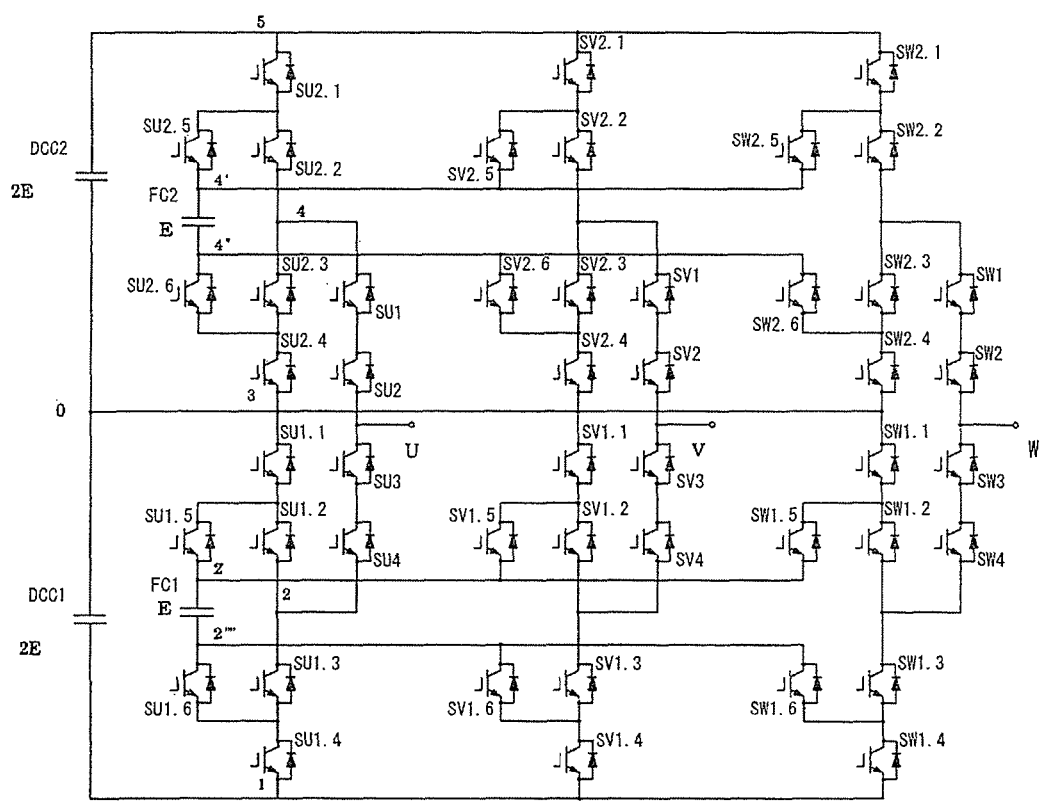
FIG. 10 is a circuit configuration diagram illustrating a multilevel power convertor in Embodiment 6.

By connecting the basic cells in series to each other in two stages (N=2 and M=3 in Embodiment 1), a 5-level power convertor illustrated in FIG. 10 can be configured. Here, as the voltage selection circuit, FIG. 3(a) is used.

In this case, voltage of each of the DC voltage sources DCC1 and DCC2 is 2E, and voltage of each of the flying capacitors FC1 and FC2 is E. Further, a basic circuit of a U phase includes first to fourth semiconductor elements SU1.1 to SU1.4 and SU2.1 to SU2.4 which are sequentially connected in series between positive and negative terminals of the two DC voltage sources DCC1 and DCC2, fifth semiconductor elements SU1.5 and SU2.5 whose one ends are respectively connected to each of common connection points of the first and second semiconductor elements SU1.1, SU1.2, SU2.1, and SU2.2, and sixth semiconductor elements SU1.6 and SU2.6 whose one ends are respectively connected to common connection points of the third and fourth semiconductor elements SU1.3, SU1.4, SU2.3 and SU2.4. This is also the same for a V phase and a W phase.

The flying capacitors FC1 and FC2 are inserted between the other ends of the fifth semiconductor elements SU1.5, SV1.5, SW1.5, SU2.5, SV2.5, SW2.5 and the other ends of sixth semiconductor elements SU1.6, SV1.6, SW1.6, SU2.6, SV2.6, SW2.6.

A voltage selection circuit of the U phase is configured by SU1 to SU4. This is also the same for the V phase and the W phase.

Here, the reference signs U, V and W indicate output terminals. As a modification example of the configuration illustrated in FIG. 10, it includes a circuit in which two or more semiconductor elements are connected in series to each other for resistance to a high voltage, and includes a circuit in which two or more semiconductor elements are connected parallel to each other for resistance to a large current.

In addition, if a withstand voltage of the semiconductor element is appropriate, the semiconductor elements SU1 and SU2 illustrated in FIG. 10 which are two semiconductor elements connected in series to each other may be replaced with a single semiconductor element. Further, this is also the same for the semiconductor elements SV1 and SV2, SW1 and SW2, SU3 and SU4, SV3 and SV4, and SW3 and SW4.

In the circuit, the flying capacitors FC1 and FC2 are in common to three phases, and thus phase voltages with five levels can be output.

Figure 11:
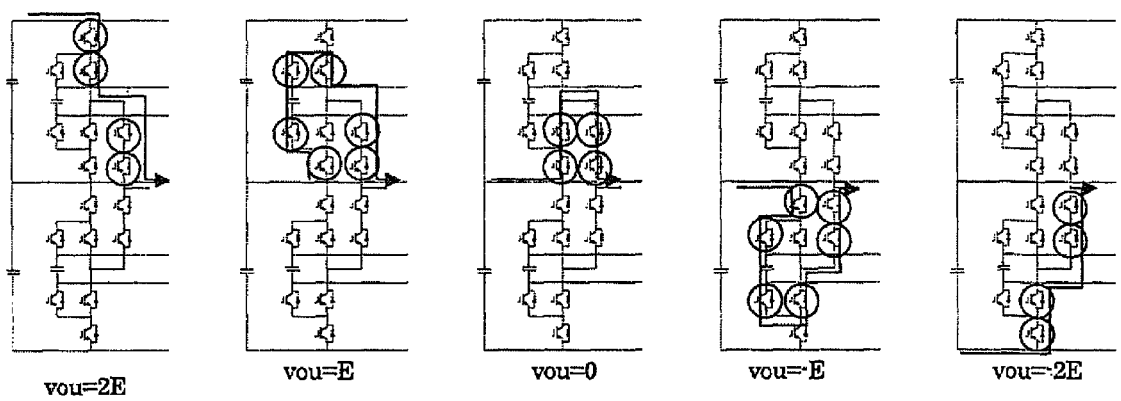
FIG. 11 is a diagram illustrating an operation example for each output voltage in Embodiment 6.

A representative switching pattern example of the U phase is illustrated in Table 1. By switching the semiconductor elements in the pattern illustrated in Table 1, five-level voltages of 2E, E, 0, −E and −2E can be output in paths illustrated in FIG. 11. Here, Table 1 and FIG. 11 are only examples, and other patterns could be used.

[Table 1]

Figure 12:
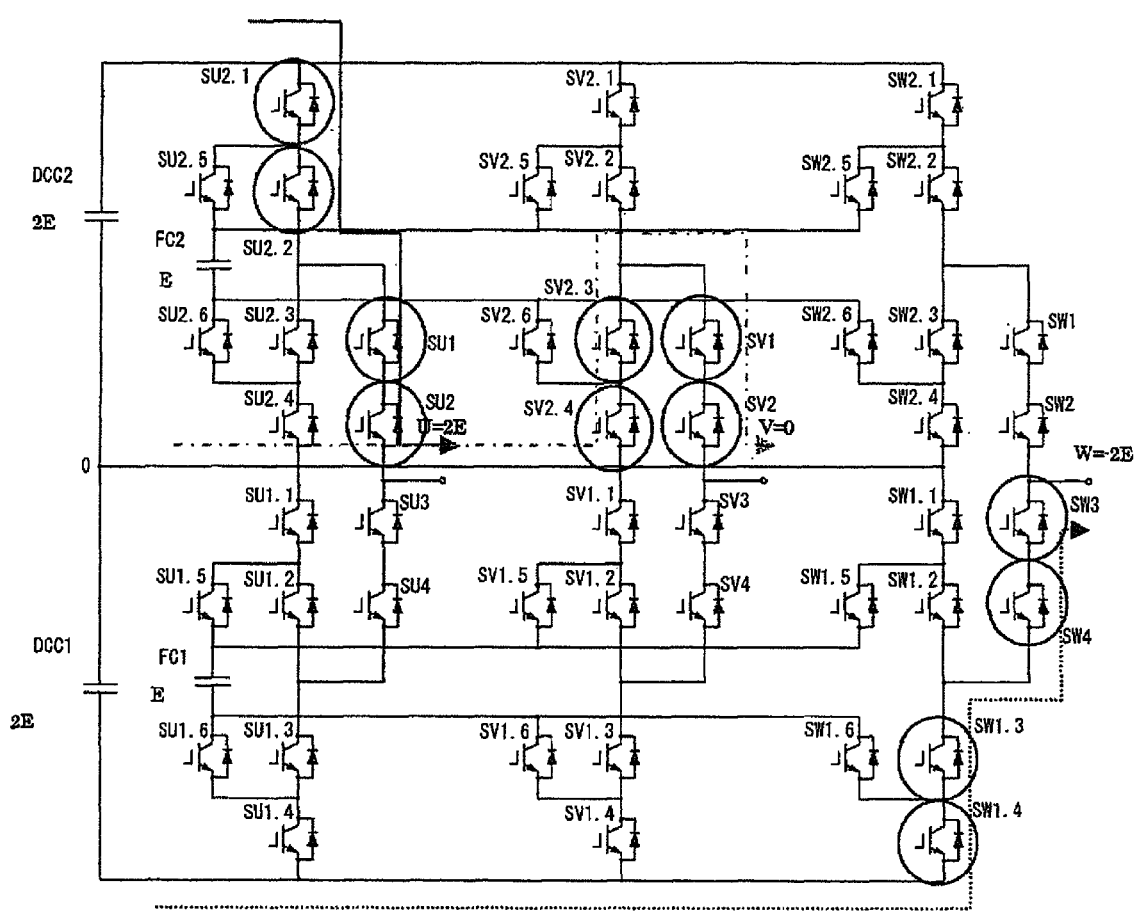
FIG. 12 is a diagram illustrating an operation example of the multilevel power convertor in Embodiment 6.

FIG. 12 illustrates an operation of each semiconductor element in a case where the output terminal U outputs voltage of 2E, the output terminal V outputs voltage of 0, and the output terminal W outputs voltage of −2E. A circular mark in FIG. 12 indicates a turned-on semiconductor element.

Even in a case where the operation is performed in the above-described switching state, by connecting the semiconductor elements SU1.5, SV1.5, SW1.5, SU1.6, SV1.6 and SW1.6 to both ends of the flying capacitor FC1, and by connecting the semiconductor elements SU2.5, SV2.5, SW2.5, SU2.6, SV2.6 and SW2.6 to both ends of the flying capacitor FC2, the operation can be performed without short-circuit of each of the flying capacitors FC1 and FC2.

Hence, it is possible to output a combination of phase voltages of 2E, 0 and −2E which cannot be outputted in the circuit configuration illustrated in FIG. 27, and also to simplify control for outputting the voltages of 2E, 0 and −2E.

Next, a withstand voltage of the semiconductor element during operation in the circuit illustrated in FIG. 12 will be explained.

As an example, a case where voltage of 2E is output in the U phase, voltage of 0 is output in the V phase, and voltage of −2E is output in the W phase will be explained. In this case, as a condition, impedances of the semiconductor elements SW2.1, SW2.2, SW1 and SW2 in OFF states are equal to each other.

In this case, a potential of a collector terminal of the semiconductor element SW2.1 is 2E and a potential of the output terminal W (i.e. a potential of an emitter terminal of the semiconductor element SW2) is −2E, and a voltage is divided by the impedances of the semiconductor elements SW2.1, SW2.2, SW1 and SW2, and thus a potential of the common connection point of the semiconductor elements SW2.2 and SW1 becomes 0. Therefore, a voltage applied to the series connection circuit of the semiconductor elements SW1 and SW2 is 2E. Here, a reference point of each potential is a terminal 0 illustrated in FIG. 10. This condition is a condition in which a voltage applied to the series circuits of the semiconductor elements SW2.1, SW2.2, SW1 and SW2 becomes the maximum (4E).

Therefore, in the circuit illustrated in FIG. 10, the maximum value of a voltage applied to the series connection circuit of the semiconductor elements SW1 and SW2 in a steady state is 2E. This is also the same for the semiconductor elements SU1 and SU2, SV1 and SV2, SU3 and SU4, SV3 and SV4, and SW3 and SW4.

On the other hand, in the circuit of the related art illustrated in FIG. 29(a), there is a mode in which voltage of the terminal W0 becomes E and voltage of the output terminal OUT_W becomes −2E according to on/off states of the switching element. In this case, a voltage of 3E is applied to the switching element SW5.

In the circuit of the related art illustrated in FIG. 29(b), there is a mode in which a voltage of the terminal W0

TABLE 1

| SU2.1 | SU2.2 | SU1 | SU2 | SU3 | SU4 | SU1.3 | SU1.4 | SU2.3 | SU2.4 | SU1.1 | SU1.2 | SU2.5 | SU2.6 | SU1.5 | SU1.6 | you |
|---|---|---|---|---|---|---|---|---|---|---|---|---|---|---|---|---|
| ON | ON | ON | ON | OFF | OFF | OFF | OFF | OFF | OFF | OFF | OFF | OFF | OFF | OFF | OFF | 2E |
| OFF | ON | ON | ON | OFF | OFF | OFF | OFF | OFF | ON | OFF | OFF | ON | ON | OFF | OFF | E |
| OFF | OFF | ON | ON | OFF | OFF | OFF | OFF | ON | ON | OFF | OFF | OFF | OFF | OFF | OFF | 0 |
| OFF | OFF | OFF | OFF | ON | ON | ON | OFF | OFF | OFF | ON | OFF | OFF | OFF | ON | ON | −E |
| OFF | OFF | OFF | OFF | ON | ON | ON | ON | OFF | OFF | OFF | OFF | OFF | OFF | OFF | OFF | −2E | becomes E, and a voltage of the output terminal OUT_W becomes −2E according to on/off states of the switching element. In this case, a voltage of 3E is applied to the switching element SW5.

From the above description, when compared with the related art circuit of FIGS. 29(a) and 29(b), Embodiment 6 has advantage of lowering a required withstand voltage of the semiconductor element that is directly connected to the output terminal.

In addition, unlike the circuit configuration of the related art illustrated in FIGS. 29(a) and 29(b), in the case of Embodiment 6, there is no semiconductor element through which currents of three phases of the U phase, the V phase and the W phase flow. Thus, a cooling fin with a high cooling effect is not necessary.

This is also advantageous in terms of cost or miniaturization of the device.

Although the three-phase output circuit has been explained in Embodiment 6, also in a circuit in which the number of output phases is increased to four or more, phase voltages of respective phases can be outputted separately without short-circuit of each of the flying capacitors FC1 and FC2. The circuit is also advantageous in a withstand voltage of the semiconductor element and is advantageous in that there is no semiconductor element through which currents of three phases flow, when compared with the circuits of the related art illustrated in FIGS. 29(a) and 29(b).

Embodiment 7

Next, a multilevel power convertor in Embodiment 7 will be explained with reference to FIG. 13. A configuration of the multilevel power convertor in Embodiment 7 is a configuration in which N=2 and M=3 in the case of Embodiment 3, and the voltage selection circuit illustrated in FIG. 3(a) is used. Here, the reference signs U, V and W indicate output terminals.

The basic circuit includes the fourth semiconductor element S2.4 whose one end is connected to a negative electrode end of the DC voltage source DCC2 in the even-numbered stage of the two serially connected DC voltage sources DCC1 and DCC2, and which is in common to three phases; the first to third semiconductor elements SU2.1 to SU2.3, SV2.1 to SV2.3, and SW2.1 to SW2.3 of the three phases which are sequentially connected in series between a positive electrode end of the DC voltage source DCC2 in the even-numbered stage and the other end of the fourth semiconductor element S2.4 in the even-numbered stage; the fifth semiconductor elements SU2.5, SV2.5 and SW2.5 whose one ends are respectively connected to common connection points of the first and second semiconductor elements SU2.1, SU2.2, SV2.1, SV2.2, SW2.1 and SW2.2 in the even-numbered stage; the first semiconductor element S1.1 whose one end is connected to the positive electrode end of the DC voltage source DCC1 in the odd-numbered stage and which is in common to three phases; the second to fourth semiconductor elements SU1.2 to SU1.4, SV1.2 to SV1.4, and SW1.2 to SW1.4 of the three phases which are sequentially connected in series between the other end of the first semiconductor element S1.1 in the odd-numbered stage and the negative electrode end of the DC voltage source DCC1 in the odd-numbered stage; and the sixth semiconductor elements SU1.6, SV1.6 and SW1.6 whose one ends are respectively connected to common connection points of the third and fourth semiconductor elements SU1.3, SU1.4, SV1.3, SV1.4, SW1.3 and SW1.4 in the odd-numbered stage.

The flying capacitor FC2 is inserted between all the fifth semiconductor elements SU2.5, SV2.5, SW2.5 and the common connection point of the third and fourth semiconductor elements SU2.3, SV2.3, SW2.3, SU2.4 in the even-numbered stage. The flying capacitor FC1 is inserted between the common connection point of the first and second semiconductor elements S1.1, SU1.2, SV1.2 and SW1.2 and all the sixth semiconductor elements SU1.6, SV1.6, SW1.6 in the odd-numbered stage.

The voltage selection circuit is configured by semiconductor elements SU1 to SU4, SV1 to SV4, and SW1 to SW4.

Figure 13:
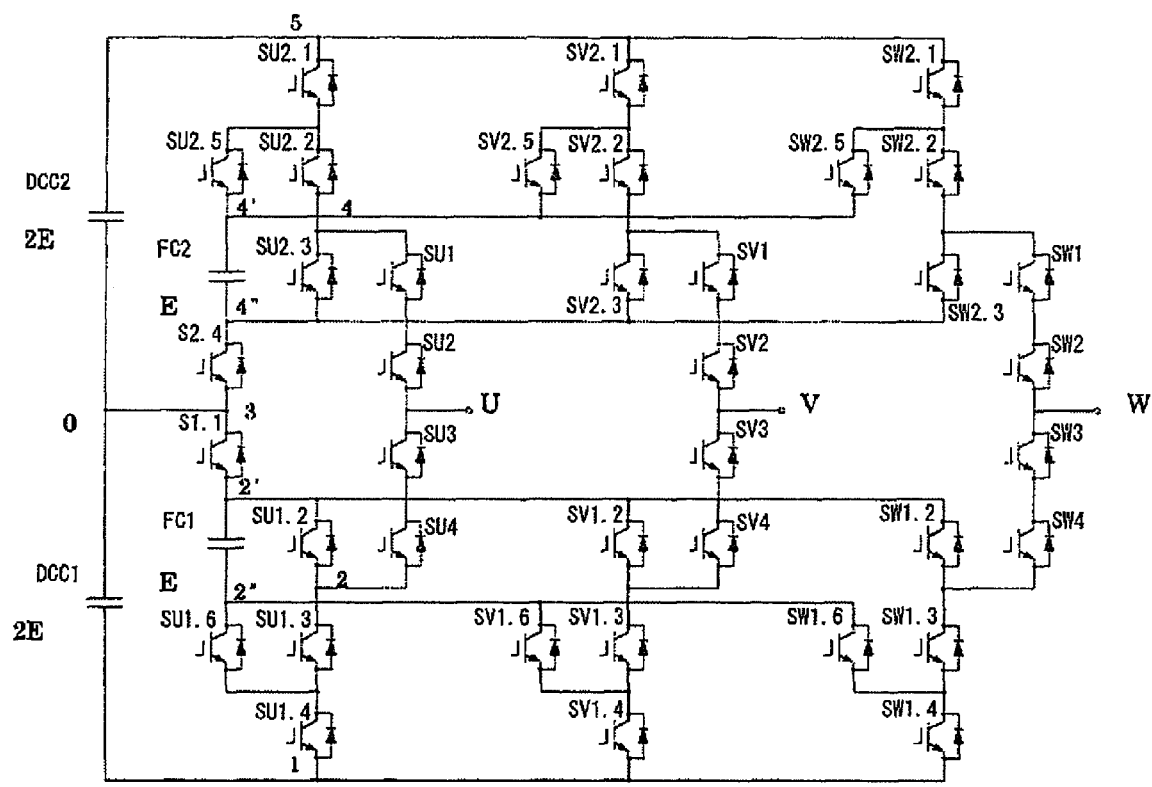
FIG. 13 is a circuit configuration diagram illustrating a multilevel power convertor in Embodiment 7.

As a modification example of the configuration illustrated in FIG. 13, it also includes a circuit in which two or more semiconductor elements are connected in series to each other for resistance to a high voltage. In addition, it also includes a circuit in which two or more semiconductor elements are connected parallel to each other for resistance to a large current.

In addition, if a withstand voltage of the semiconductor element is appropriate, the semiconductor elements SU1 and SU2 illustrated in FIG. 13 which are two semiconductor elements connected in series to each other may be replaced with a single semiconductor element. Further, this is also the same for the semiconductor elements SV1 and SV2, SW1 and SW2, SU3 and SU4, SV3 and SV4, and SW3 and SW4.

Figure 14:
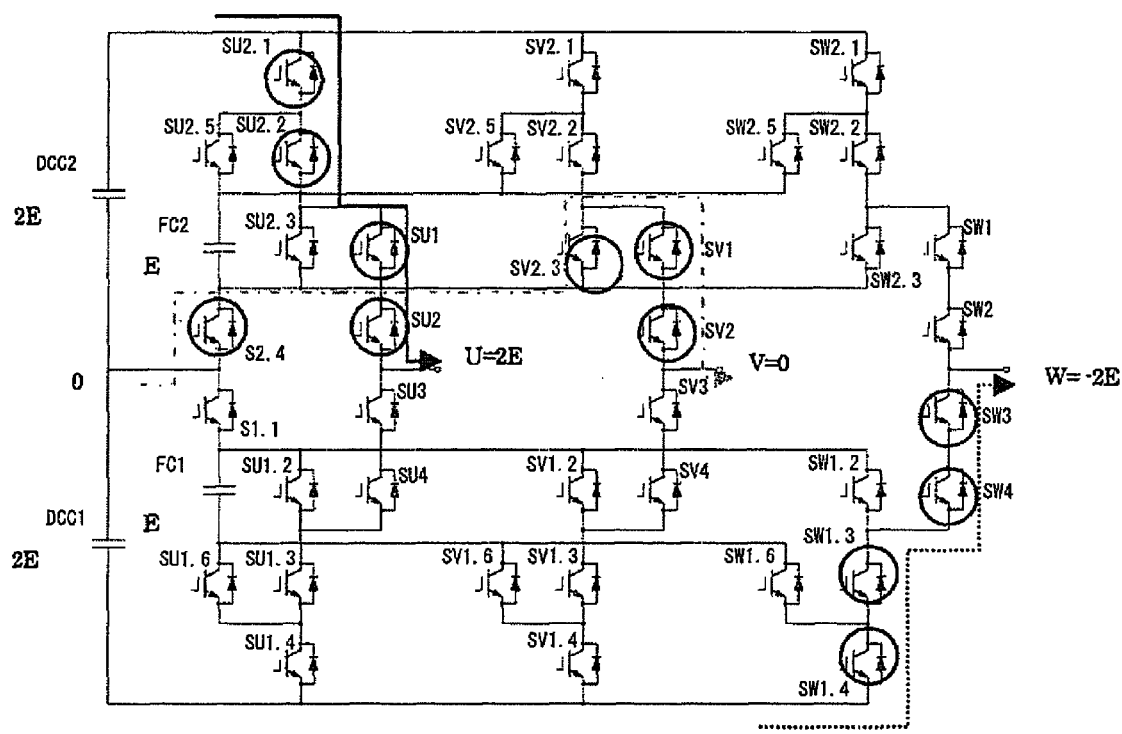
FIG. 14 is a diagram illustrating an operation example of the multilevel power convertor in Embodiment 7.

Also in Embodiment 7, it is possible to output a combination of phase voltages of 2E, 0 and −2E which cannot be outputted in the circuit configuration illustrated in FIG. 27. FIG. 14 illustrates such a state. In FIG. 14, the circular mark indicates a turned-on semiconductor element.

FIG. 14 illustrates an operation of each semiconductor element in a case where the output terminal U outputs voltage of 2E, the output terminal V outputs voltage of 0, and the output terminal W outputs voltage of −2E. In this case, since the flying capacitor FC2 is connected to the semiconductor elements SU2.5, SV2.5 and SW2.5 and the flying capacitor FC1 is connected to the semiconductor elements SU1.6, SV1.6 and SW1.6, it is possible to output a combination of phase voltages of 2E, 0 and −2E without short-circuit of each of the flying capacitors FC1 and FC2, and also to simplify control for outputting the voltages of 2E, 0 and −2E.

Also in Embodiment 7, in a condition in which impedances of the semiconductor elements SW2.1, SW2.2, SW1 and SW2 in OFF states are the same as each other, the maximum value of a voltage applied to the series connection circuit of the semiconductor elements SW1 and SW2 in a steady state is 2E in the same manner as in Embodiment 6. This is also the same for the semiconductor elements SU1 and SU2, SV1 and SV2, SW1 and SW2, SU3 and SU4, SV3 and SV4, and SW3 and SW4.

Although the three-phase output circuit has been explained in Embodiment 7, also in a circuit in which the number of output phases is increased to four or more, phase voltages of respective phases can be outputted separately without short-circuit of each of the flying capacitors FC1 and FC2. The circuit is also advantageous in a withstand voltage of the semiconductor element when compared with the circuits of the related art illustrated in FIGS. 29(a) and 29(b).

Embodiment 8

Figure 15:
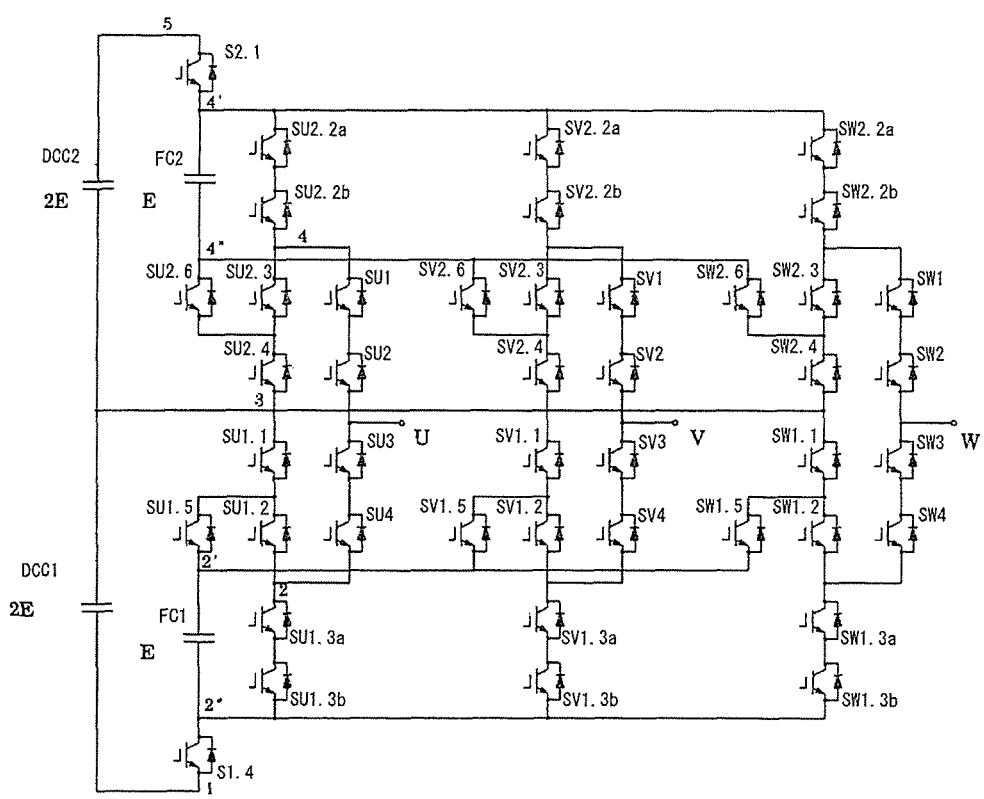
FIG. 15 is a circuit configuration diagram illustrating a multilevel power convertor in Embodiment 8.

FIG. 15 is a circuit configuration diagram illustrating a multilevel power convertor in Embodiment 8. A configuration of the multilevel power convertor in Embodiment 8 is a configuration in which N=2 and M=3 and the voltage selection circuit illustrated in FIG. 3(a) is used in Embodiment 2. The reference signs U, V and W indicate output terminals.

The basic circuit includes the first semiconductor element S2.1 whose one end is connected to a positive electrode end of the DC voltage source DCC2 in the even-numbered stage of the two serially connected DC voltage sources DCC1 and DCC2, and which is in common to three phases; second to fourth semiconductor elements SU2.2a to SU2.4, SV2.2a to SV2.4, and SW2.2a to SW2.4 of the three phases which are sequentially connected in series between the other end of the first semiconductor element S2.1 in the even-numbered stage and a negative electrode end of the DC voltage source DCC2 in the even-numbered stage; the sixth semiconductor elements SU2.6, SV2.6 and SW2.6 of the three phases whose one ends are respectively connected to common connection points of the third and fourth semiconductor elements SU2.3, SU2.4, SV2.3, SV2.4, SW2.3 and SW2.4; the fourth semiconductor element S1.4 whose one end is connected to a negative electrode end of the DC voltage source DCC1 in the odd-numbered stage and which is in common to the three phase; first to third semiconductor elements SU1.1 to SU1.3b, SV1.1 to SV1.3b, and SW1.1 to SW1.3b of the three phases which are sequentially connected in series between a positive electrode end of the DC voltage source DCC1 in the odd-numbered stage and the other end of the fourth semiconductor element S1.4 in the odd-numbered stage; and the fifth semiconductor elements SU1.5, SV1.5 and SW1.5 of the three phases whose one ends are respectively connected to common connection points of the first and second semiconductor elements SU1.1, SU1.2, SV1.1, SV1.2, SW1.1 and SW1.2 in the odd-numbered stage.

The flying capacitor FC2 is inserted between the common connection points of the first and second semiconductor elements S2.1, SU2.2a, SV2.2a and SW2.2a in the even-numbered stage and the other ends of the sixth semiconductor elements SU2.6, SV2.6, SW2.6 of all the phases in the even-numbered stage. The flying capacitor FC1 is inserted between the other ends of the fifth semiconductor elements SU1.5, SV1.5, SW1.5 of all the phases in the odd-numbered stage and the common connection points of the third and fourth semiconductor elements SU1.3b, SV1.3b, SW1.3b and S1.4 in the odd-numbered stage.

The voltage selection circuit is configured by the semiconductor elements SU1 to SU4, SV1 to SV4, and SW1 to SW4.

Also in Embodiment 8, it is possible to output a combination of phase voltages of 2E, 0 and −2E which cannot be output in the circuit configuration illustrated in FIG. 27.

Figure 16:
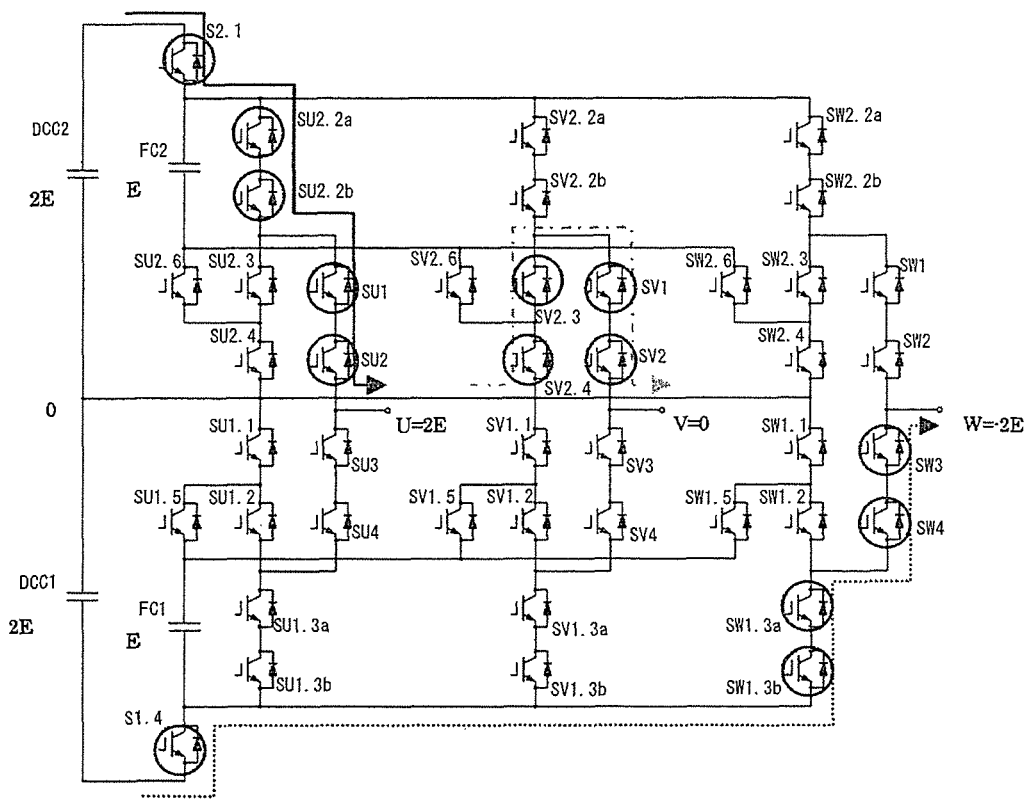
FIG. 16 is a diagram illustrating an operation example of the multilevel power convertor in Embodiment 8.

FIG. 16 illustrates such a state. In FIG. 16, the circular mark indicates a turned-on semiconductor element. FIG. 16 illustrates an operation of each semiconductor element in a case where the output terminal U outputs voltage of 2E, the output terminal V outputs voltage of 0, and the output terminal W outputs voltage of −2E. In this case, since the flying capacitor FC1 is connected to the fifth semiconductor elements SU1.5, SV1.5 and SW1.5 and the flying capacitor FC2 is connected to the sixth semiconductor elements SU2.6, SV2.6 and SW2.6, it is possible to output a combination of phase voltages of 2E, 0 and −2E from the output terminals U, V and W without short-circuit of each of the flying capacitors FC1 and FC2, and also to simplify control for outputting the voltages of 2E, 0 and −2E.

As a modification example of Embodiment 8, it also includes a circuit in which two or more semiconductor elements are connected in series to each other for resistance to a high voltage. In addition, it also includes a circuit in which two or more semiconductor elements are connected parallel to each other for resistance to a large current. Further, if a withstand voltage of the semiconductor element is appropriate, the semiconductor elements SU1.3a and SU1.3b illustrated in FIG. 15 which are two semiconductor elements connected in series to each other may be replaced with a single semiconductor element.

Further, this is also the same for the semiconductor elements SV1.3a and SV1.3b, SW1.3a and SW1.3b, SU2.2a and SU2.2b, SV2.2a and SV2.2b, SW2.2a and SW2.2b, SU1 and SU2, SV1 and SV2, SW1 and SW2, SU3 and SU4, SV3 and SV4, and SW3 and SW4.

Also in Embodiment 8, in a condition in which impedances of the semiconductor elements SW2.2a, SW2.2b, SW1 and SW2 in OFF states are the same as each other, the maximum value of a voltage applied to the series connection circuit of the semiconductor elements SW1 and SW2 in a steady state is 2E in the same manner as in Embodiment 6. This is also the same for the semiconductor elements SU1 and SU2, SV1 and SV2, SU3 and SU4, SV3 and SV4, and SW3 and SW4.

Although the three-phase output circuit has been explained in Embodiment 8, also in a circuit in which the number of output phases is increased to four or more, phase voltages of respective phases can be outputted separately without short-circuit of each of the flying capacitors FC1 and FC2. The circuit is also advantageous in a withstand voltage of the semiconductor element when compared with the circuits of the related art illustrated in FIGS. 29(a) and 29(b).

Embodiment 9

Next, a multilevel power convertor in Embodiment 9 will be explained with reference to FIG. 17. A configuration of the multilevel power convertor in Embodiment 9 is a configuration in which N=2 and M=3 in the case of Embodiment 4, and the voltage selection circuit illustrated in FIG. 3(a) is used. The reference signs U, V and W indicate output terminals.

The basic circuit includes the second to fourth semiconductor elements SU2.2 to SU2.4, SV2.2 to SV2.4, and SW2.2 to SW2.4 which are sequentially connected in series to a positive electrode end of the DC voltage source DCC2 in the even-numbered stage of the two serially connected DC voltage sources DCC1 and DCC2; and the third to first semiconductor elements SU1.3 to SU1.1, SV1.3 to SV1.1, and SW1.3 to SW1.1 which are sequentially connected in series to a negative electrode end of the DC voltage source DCC1 in the odd-numbered stage of the two serially connected DC voltage sources DCC1 and DCC2.

The flying capacitor FC1 is connected parallel to the second and third semiconductor elements SU1.3, SU1.2, SV1.3, SV1.2, SW1.3 and SW1.2 in the odd-numbered stage. The flying capacitor FC2 is connected parallel to the second and third semiconductor elements SU2.2, SU2.3, SV2.2, SV2.3, SW2.2 and SW2.3 in the even-numbered stage.

In addition, the fifth semiconductor elements SU1.5, SV1.5 and SW1.5 are inserted between the flying capacitor FC1 and the second semiconductor elements SU1.2, SV1.2, SW1.2 in the odd-numbered stage. The sixth semiconductor elements SU2.6, SV2.6 and SW2.6 are inserted between the flying capacitor FC2 and the third semiconductor elements SU2.3, SV2.3, SW2.3 in the even-numbered stage.

Further, the first semiconductor elements SU1.1, SV1.1 and SW1.1 are inserted between the second semiconductor elements SU1.2, SV1.2, SW1.2 in the odd-numbered stage and the terminal 0. The fourth semiconductor elements SU2.4, SV2.4 and SW2.4 are inserted between the third semiconductor elements SU2.3, SV2.3, SW2.3 in the even-numbered stage and the terminal 0.

The voltage selection circuit is configured by the semiconductor elements SU1, SU3, SV1, SV3, SW1 and SW3.

By controlling each of voltages of the DC voltage sources DCC1 and DCC2 to 2E and controlling each of voltages of the flying capacitors FC1 and FC2 to E, it is possible to output five-level voltages of 2E, E, 0, −E and −2E.

Figure 17:
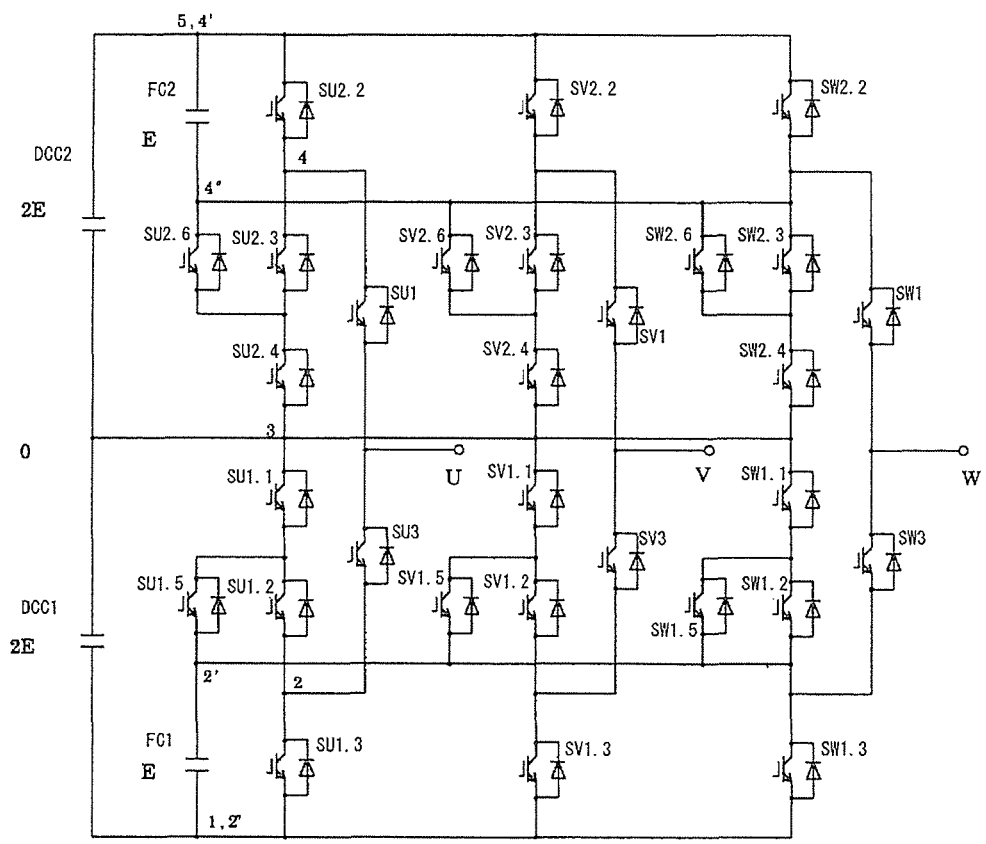
FIG. 17 is a circuit configuration diagram illustrating a multilevel power convertor in Embodiment 9.

As a modification example of the configuration illustrated in FIG. 17, it also includes a circuit in which two or more semiconductor elements are connected in series to each other for resistance to a high voltage. In addition, it also includes a circuit in which two or more semiconductor elements are connected parallel to each other for resistance to a large current.

Figure 18:
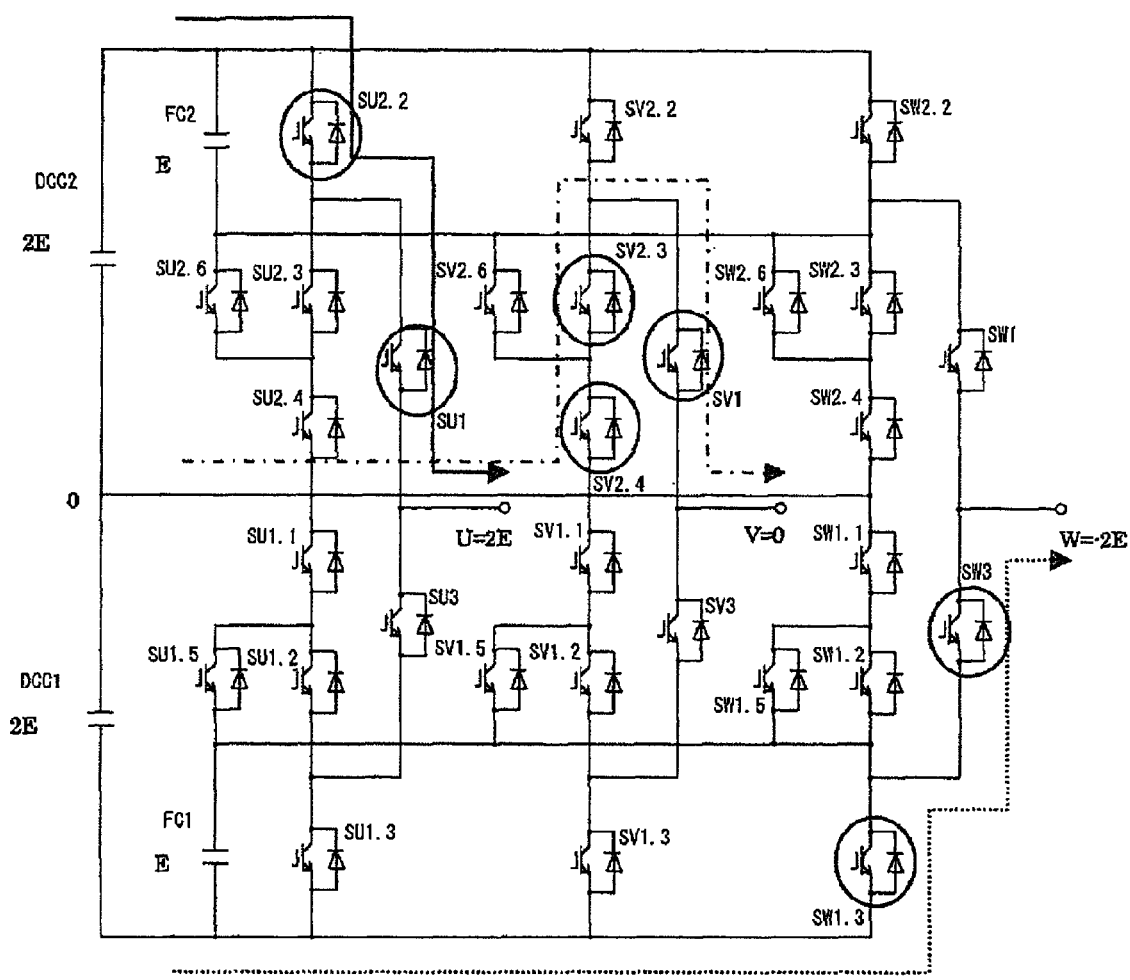
FIG. 18 is a diagram illustrating an operation example of the multilevel power convertor in Embodiment 9.

FIG. 18 illustrates an operation of each semiconductor element in a case where the output terminal U outputs voltage of 2E, the output terminal V outputs voltage of 0, and the output terminal W outputs voltage of −2E. In FIG. 18, the circular mark indicates a turned-on semiconductor element. In this case, since the flying capacitor FC1 is connected to the semiconductor elements SU1.5, SV1.5 and SW1.5 and the flying capacitor FC2 is connected to the semiconductor elements SU2.6, SV2.6 and SW2.6, it is possible to output a combination of phase voltages of 2E, 0 and −2E from the output terminals U, V and W without short-circuit of each of the flying capacitors FC1 and FC2, and also to simplify control for outputting the voltages of 2E, 0 and −2E.

Also in Embodiment 9, in a condition in which impedances of the semiconductor elements SW2.2 and SW1 in OFF states are the same as each other, the maximum value of a voltage applied to the semiconductor element SW1 in a steady state is 2E in the same manner as in Embodiment 6. This is also the same for the semiconductor elements SU1, SV1, SU3, SV3 and SW3.

In addition, unlike the circuit configuration of the related art illustrated in FIGS. 29(a) and 29(b), in the case of Embodiment 9, there is no semiconductor element through which currents of three phases of the U phase, the V phase and the W phase flow. Thus, a cooling fin with a high cooling effect is not necessary.

Although the three-phase output circuit has been explained in Embodiment 9, also in a circuit in which the number of output phases is increased to four or more, phase voltages of respective phases can be outputted separately without short-circuit of each of the flying capacitors FC1 and FC2. The circuit is also advantageous in a withstand voltage of the semiconductor element and is advantageous in that there is no semiconductor element through which currents of three phases flow, when compared with the circuits of the related art illustrated in FIGS. 29(a) and 29(b).

Embodiment 10

Next, a multilevel power convertor in Embodiment 10 will be explained with reference to FIG. 19. A configuration of the multilevel power convertor in Embodiment 10 is a configuration in which N=2 and M=3 in the case of Embodiment 4. The reference signs U, V and W indicate output terminals. As the voltage selection circuit, FIG. 3(b) is used.

The basic circuit includes the second and third semiconductor elements SU2.2, SU2.3, SV2.2, SV2.3, SW2.2 and SW2.3 which are sequentially connected in series to a positive electrode end of the DC voltage source DCC2 in the even-numbered stage of the two serially connected DC voltage sources DCC1 and DCC2; and the third and second semiconductor elements SU1.3, SU1.2, SV1.3, SV1.2, SW1.3 and SW1.2 which are sequentially connected in series to a negative electrode end of the DC voltage source DCC1 in the odd-numbered stage of the two serially connected DC voltage sources DCC1 and DCC2.

The flying capacitor FC1 is connected parallel to the second and third semiconductor elements SU1.2, SU1.3, SV1.2, SV1.3, SW1.2 and SW1.3 in the odd-numbered stage. The flying capacitor FC2 is connected parallel to the second and third semiconductor elements SU2.2, SU2.3, SV2.2, SV2.3, SW2.2 and SW2.3 in the even-numbered stage.

The voltage selection circuit is configured by the semiconductor elements SU7, SU8, SU11, SU12, SV7, SV8, SV11, SV12, SW7, SW8, SW11 and SW12.

By controlling each of voltages of the DC voltage sources DCC1 and DCC2 to 2E and controlling each of voltages of the flying capacitors FC1 and FC2 to E, it is possible to output five-level voltages of 2E, E, 0, −E and −2E.

Figure 19:
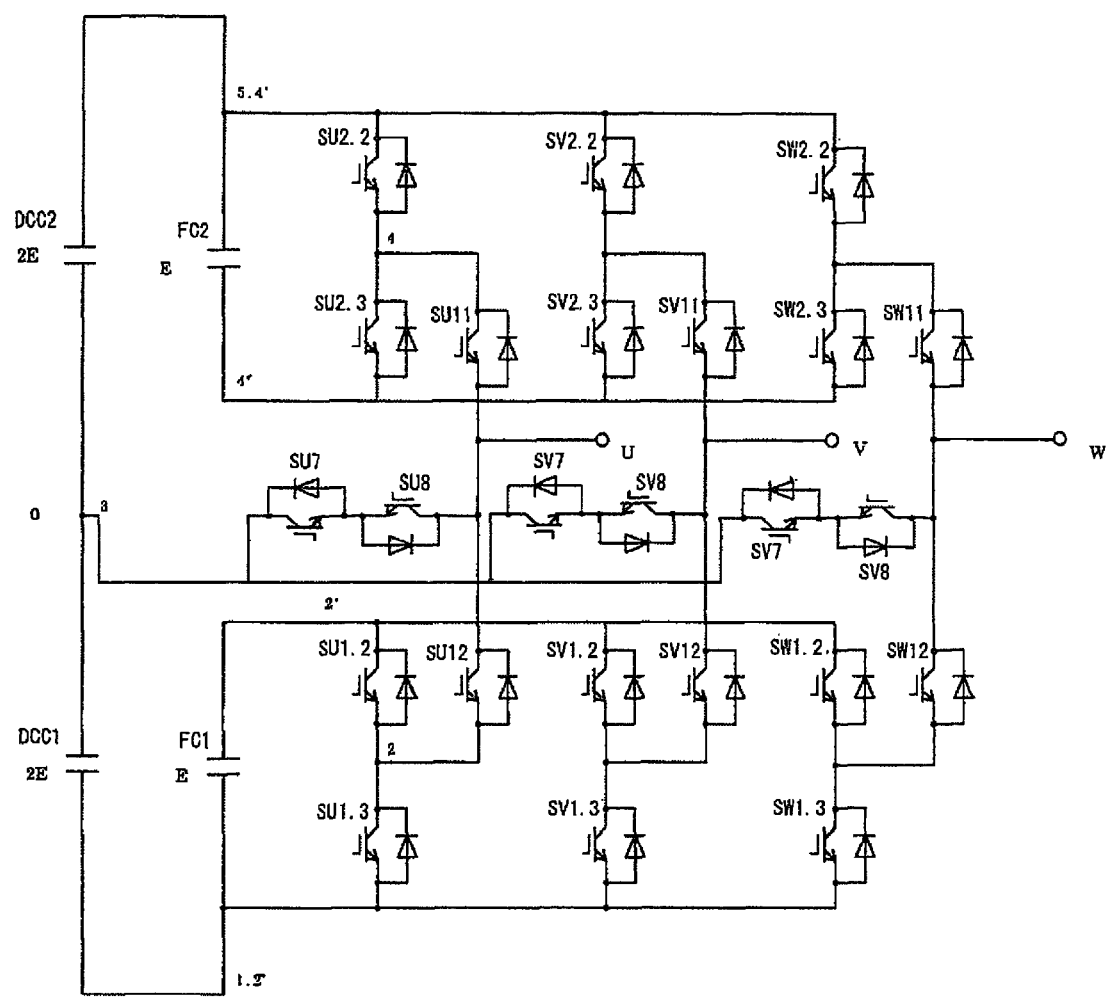
FIG. 19 is a circuit configuration diagram illustrating a multilevel power convertor in Embodiment 10.

As a modification example of the configuration illustrated in FIG. 19, it also includes a circuit in which two or more semiconductor elements are connected in series to each other for resistance to a high voltage. In addition, is also includes a circuit in which two or more semiconductor elements are connected parallel to each other for resistance to a large current.

Figure 20:
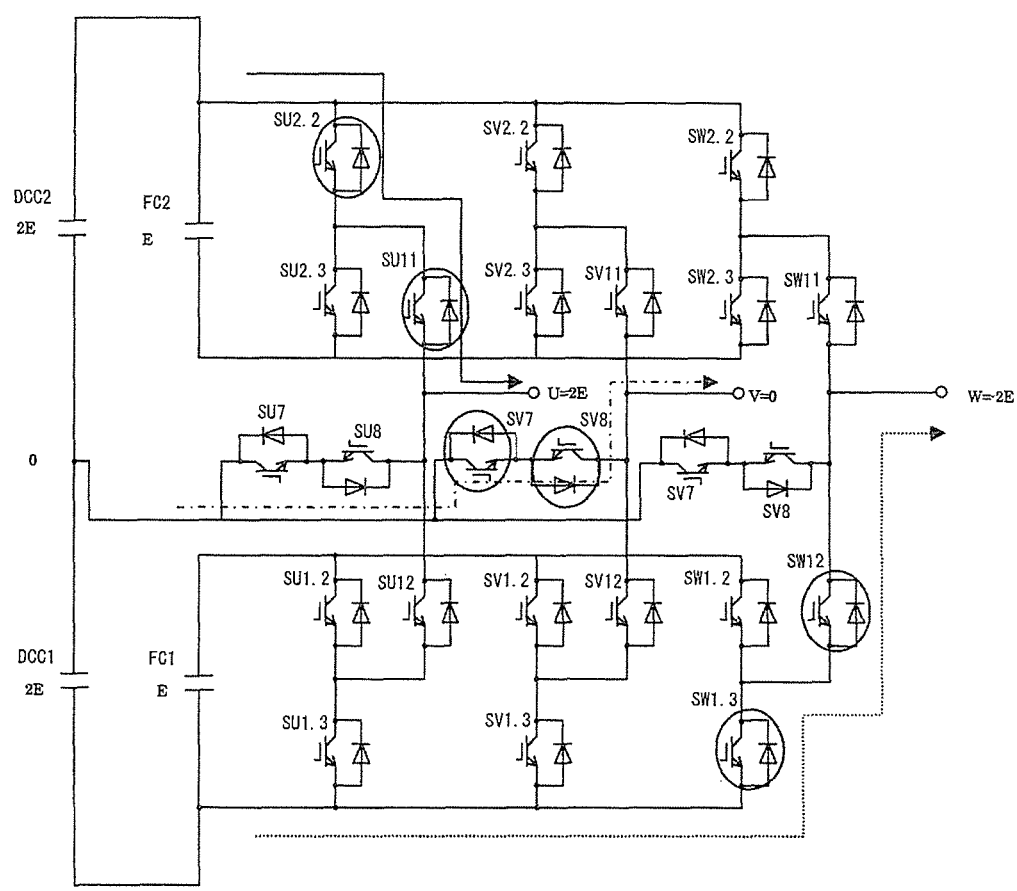
FIG. 20 is a diagram illustrating an operation example of the multilevel power convertor in Embodiment 10.

FIG. 20 illustrates an operation of each semiconductor element in a case where the output terminal 17 outputs voltage of 2E, the output terminal V outputs voltage of 0, and the output terminal W outputs voltage of −2E. In FIG. 20, the circular mark indicates a turned-on semiconductor element. In this case, since the negative electrode side of the flying capacitor FC2 is not connected to the negative electrode side of the DC voltage source DCC2 and the positive electrode side of the flying capacitor FC1 is not connected to the DC voltage source DCC1, it is possible to output a combination of phase voltages of 2E, 0 and −2E from the output terminals U, V and W without short-circuit of each of the flying capacitors FC1 and FC2, and also to simplify control for outputting the voltages of 2E, 0 and −2E.

In addition, unlike the circuit configuration of the related art illustrated in FIGS. 29(a) and 29(b), in the case of Embodiment 10, there is no semiconductor element through which currents of three phases of the U phase, the V phase and the W phase flow. Thus, a cooling fin with a high cooling effect is not necessary.

Although the three-phase output circuit has been explained in Embodiment 10, also in a circuit in which the number of output phases is increased to four or more, phase voltages of respective phases can be outputted separately without short-circuit of each of the flying capacitors FC1 and FC2. The circuit is also advantageous in a withstand voltage of the semiconductor element and is advantageous in that there is no semiconductor element through which currents of three phases flow, when compared with the circuits of the related art illustrated in FIGS. 29(a) and 29(b).

Embodiment 11

Next, a multilevel power convertor in Embodiment 11 will be explained with reference to FIG. 21. A configuration of the multilevel power convertor in Embodiment 11 is a configuration in which N=2 and M=3 in the case of Embodiment 4. As the voltage selection circuit, FIG. 3(c) is used.

The basic circuit includes the second and third semiconductor elements SU2.2, SU2.3, SV2.2, SV2.3, SW2.2 and SW2.3 which are sequentially connected in series to a positive electrode end of the DC voltage source DCC2 in the even-numbered stage of the two serially connected DC voltage sources DCC1 and DCC2; and the third and second semiconductor elements SU1.3, SU1.2, SV1.3, SV1.2, SW1.3 and SW1.2 which are sequentially connected in series to a negative electrode end of the DC voltage source DCC1 in the odd-numbered stage of the two serially connected DC voltage sources DCC1 and DCC2.

The flying capacitor FC1 is connected parallel to the second and third semiconductor elements SU1.2, SU1.3, SV1.2, SV1.3, SW1.2 and SW1.3 in the odd-numbered stage. The flying capacitor FC2 is connected parallel to the second and third semiconductor elements SU2.2, SU2.3, SV2.2, SV2.3, SW2.2 and SW2.3 in the even-numbered stage.

The voltage selection circuit is configured by diodes DU1, DU2, DV1, DV2, DW1 and DW2, and the semiconductor elements SU12 to SU15, SV12 to SV15, and SW12 to SW15.

By controlling each of voltages of the DC voltage sources DCC1 and DCC2 to 2E and controlling each of voltages of the flying capacitors FC1 and FC2 to E, it is possible to output five-level voltages of 2E, E, 0, −E and −2E from the output terminals U, V and W.

Figure 21:
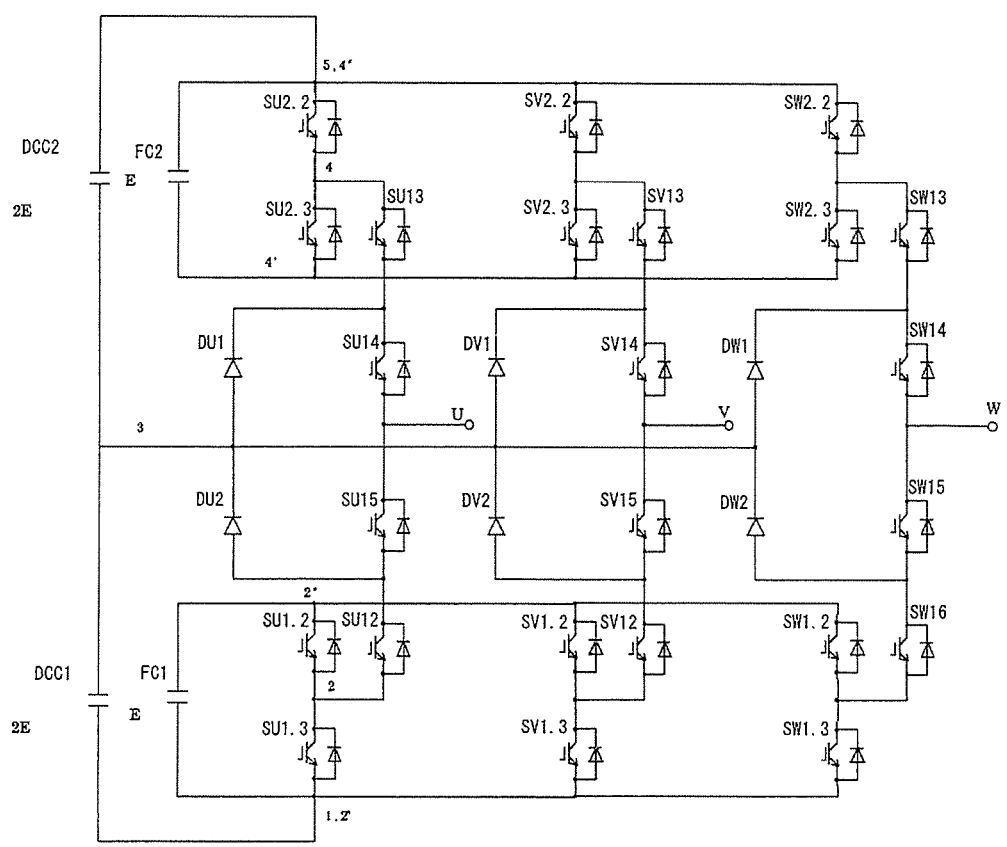
FIG. 21 is a circuit configuration diagram illustrating a multilevel power convertor in Embodiment 11.

As a modification example of the configuration illustrated in FIG. 21, it also includes a circuit in which two or more semiconductor elements are connected in series to each other for resistance to a high voltage. In addition, is also includes a circuit in which two or more semiconductor elements are connected parallel to each other for resistance to a large current.

Figure 22:
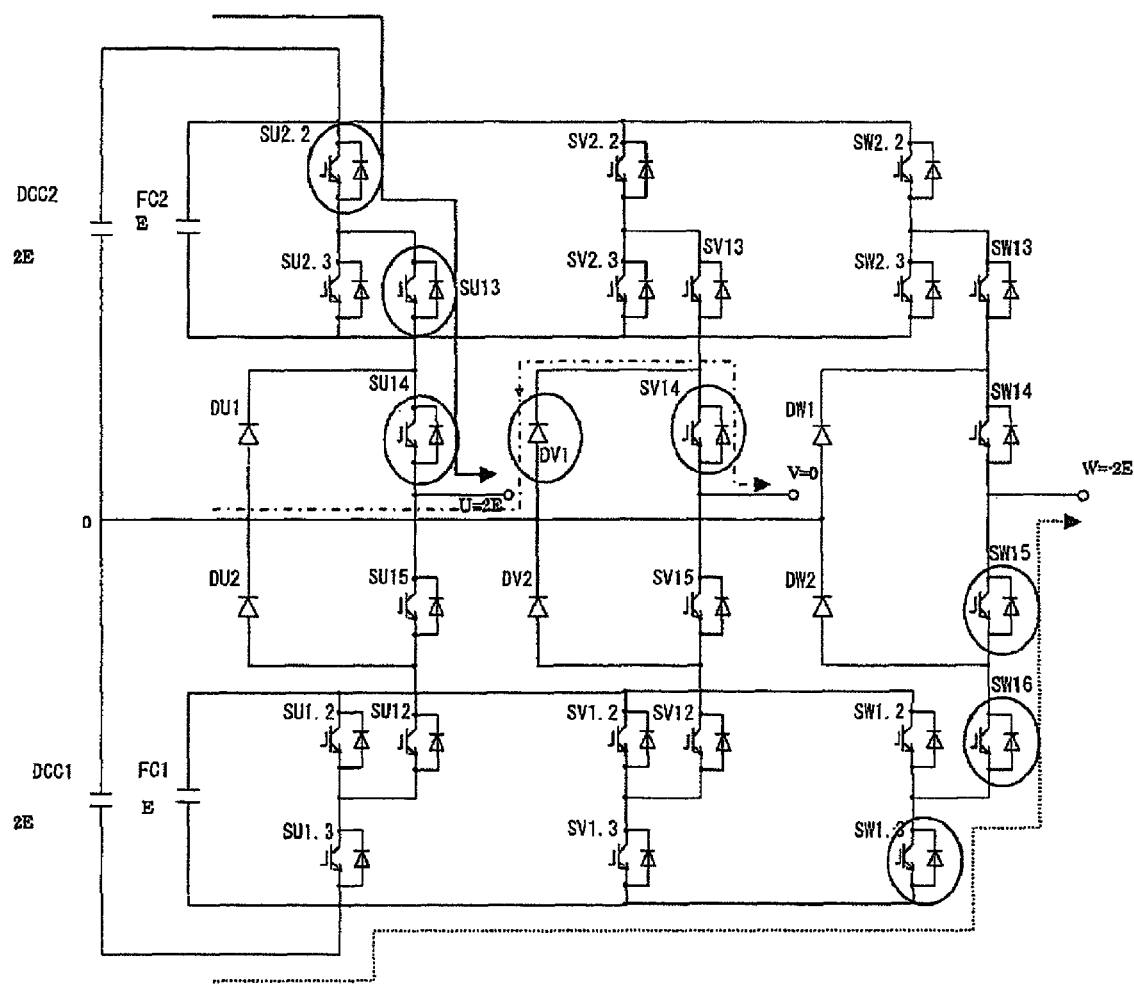
FIG. 22 is a diagram illustrating an operation example of the multilevel power convertor in Embodiment 11.

FIG. 22 illustrates an operation of each semiconductor element in a case where the output terminal U outputs voltage of 2E, the output terminal V outputs voltage of 0, and the output terminal W outputs voltage of −2E. In FIG. 22, the circular mark indicates a turned-on semiconductor element. In this case, since the negative electrode side of the flying capacitor FC2 is not connected to the negative electrode side of the DC voltage source DCC2 and the positive electrode side of the flying capacitor FC1 is not connected to the positive side of the DC voltage source DCC1, it is possible to output a combination of phase voltages of 2E, 0 and −2E from the output terminals U, V and W respectively, without short-circuit of each of the flying capacitors FC1 and FC2, and also to simplify control for outputting the voltages of 2E, 0 and −2E.

In addition, unlike the circuit configuration of the related art illustrated in FIGS. 29(a) and 29(b), in the case of Embodiment 11, there is no semiconductor element through which currents of three phases of the U phase, the V phase and the W phase flow. Thus, a cooling fin with a high cooling effect is not necessary.

Although the three-phase output circuit has been explained in Embodiment 11, also in a circuit in which the number of output phases is increased to four or more, phase voltages of respective phases can be outputted separately without short-circuit of each of the flying capacitors FC1 and FC2. The circuit is also advantageous in a withstand voltage of the semiconductor element and is advantageous in that there is no semiconductor element through which currents of three phases flow, when compared with the circuits of the related art illustrated in FIGS. 29(a) and 29(b).

Embodiment 12

Next, a multilevel power convertor in Embodiment 12 will be explained with reference to FIG. 23. A configuration of the multilevel power convertor in Embodiment 12 is a configuration in which N=2 and M=3 in the case of Embodiment 5. As the voltage selection circuit, FIG. 3(c) is used.

The basic circuit includes the first to third semiconductor elements SU2.1 to SU2.3, SV2.1 to SV2.3, and SW2.1 to SW2.3 which are sequentially connected in series between positive and negative electrode ends of the DC voltage source DCC2 in the even-numbered stage of the two serially connected DC voltage sources DCC1 and DCC2; the fifth semiconductor elements SU2.5, SV2.5 and SW2.5 whose one ends are connected to common connection points of the first and second semiconductor elements SU2.1, SU2.2, SV2.1, SV2.2, SW2.1 and SW2.2 in the even-numbered stage; the second to fourth semiconductor elements SU1.2 to SU1.4, SV1.2 to SV1.4, and SW1.2 to SW1.4 which are sequentially connected in series between positive and negative electrode ends of the DC voltage source DCC1 in the odd-numbered stage of the two serially connected DC voltage sources DCC1 and DCC2; and the sixth semiconductor elements SU1.6, SV1.6 and SW1.6 whose one ends are connected to common connection points of the third and fourth semiconductor elements SU1.3, SU1.4, SV1.3, SV1.4, SW1.3 and SW1.4 in the odd-numbered stage.

The flying capacitor FC2 is inserted between the other ends of all the fifth semiconductor elements SU2.5, SV2.5, SW2.5 in the even-numbered stage and the common connection point of the negative electrode end of the DC voltage source DCC2 in the even-numbered stage and the third semiconductor elements SU2.3, SV2.3, SW2.3. The flying capacitor FC1 is inserted between the other ends of the sixth semiconductor elements SU1.6, SV1.6, SW1.6 in the odd-numbered stage and the common connection point of the positive electrode end of the DC voltage source DCC1 in the odd-numbered stage and the second semiconductor elements SU1.2, SV1.2, SW1.2.

The voltage selection circuit is configured by the semiconductor elements SU14, SU15, SV14, SV15, SW14 and SW15.

By controlling each of voltages of the DC voltage sources DCC1 and DCC2 to 2E and controlling each of voltages of the flying capacitors FC1 and FC2 to E, it is possible to output five-level voltages of 2E, E, 0, −E and −2E from the output terminals U, V and W.

Figure 23:
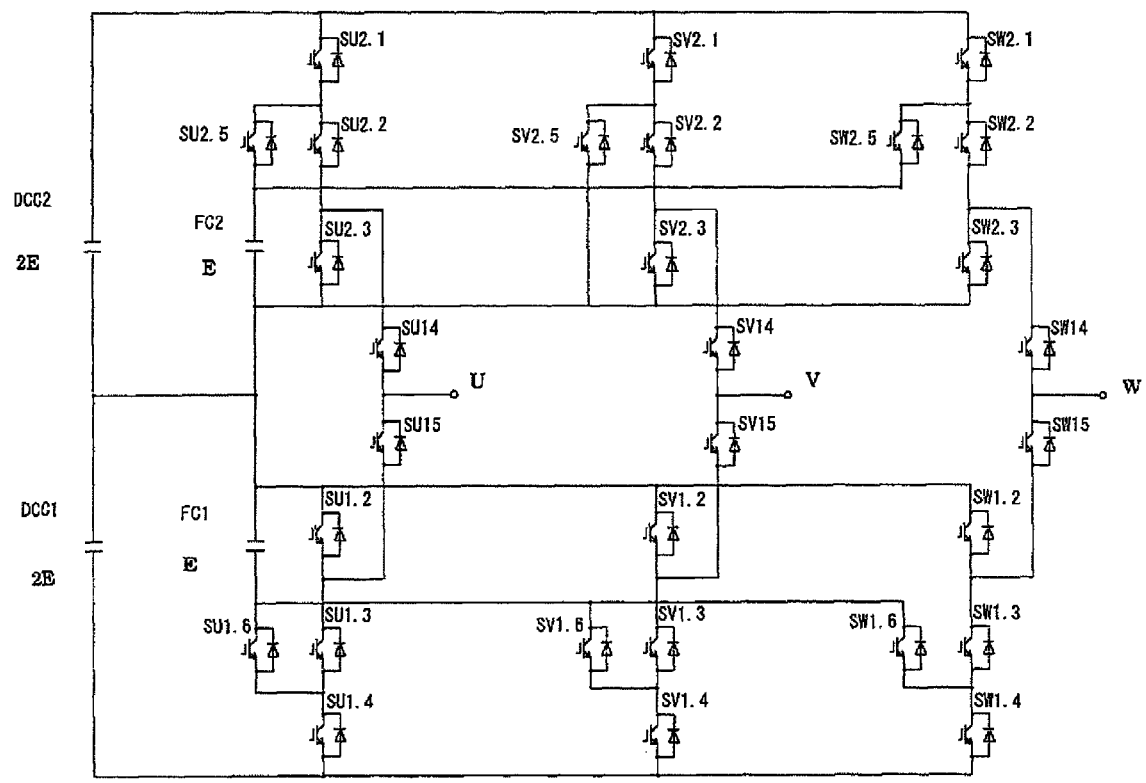
FIG. 23 is a circuit configuration diagram illustrating a multilevel power convertor in Embodiment 12.

As a modification example of the configuration illustrated in FIG. 23, it also includes a circuit in which two or more semiconductor elements are connected in series to each other for resistance to a high voltage. In addition, it also includes a circuit in which two or more semiconductor elements are connected parallel to each other for resistance to a large current.

Figure 24:
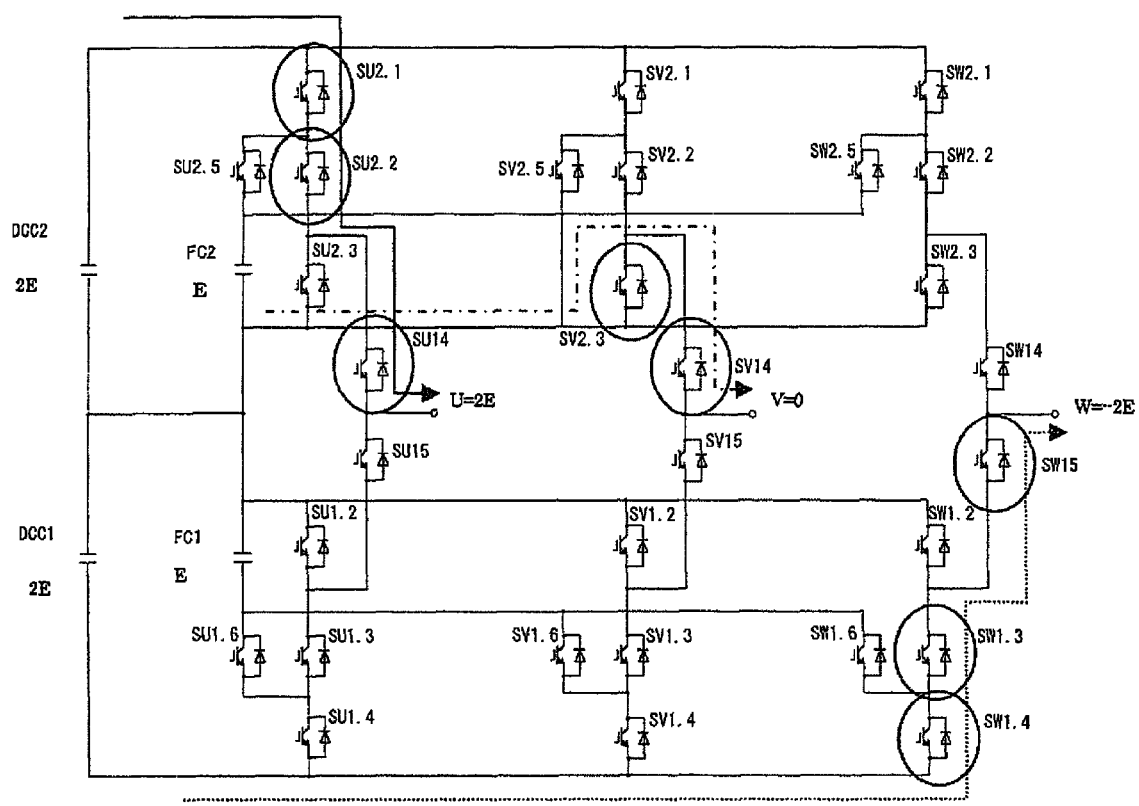
FIG. 24 is a diagram illustrating an operation example of the multilevel power convertor in Embodiment 12.

FIG. 24 illustrates an operation of each semiconductor element in a case where the output terminal U outputs voltage of 2E, the output terminal V outputs voltage of 0, and the output terminal W outputs voltage of −2E. In FIG. 24, the circular mark indicates a turned-on semiconductor element.

In this case, since the flying capacitor FC1 is connected to the sixth semiconductor elements SU1.6, SV1.6, and SW1.6 and the flying capacitor FC2 is connected to the fifth semiconductor elements SU2.5, SV2.5 and SW2.5, it is possible to output a combination of phase voltages of 2E, 0 and −2E from the output terminals U, V and W respectively, without short-circuit of each of the flying capacitors FC1 and FC2, and also to simplify control for outputting the voltages of 2E, 0 and −2E.

In addition, unlike the circuit configuration of the related art illustrated in FIGS. 29(a) and 29(b), in the case of Embodiment 12, there is no semiconductor element through which currents of three phases of the U phase, the V phase and the W phase flow. Thus, a cooling fin with a high cooling effect is not necessary.

Although the three-phase output circuit has been explained in Embodiment 12, also in a circuit in which the number of output phases is increased to four or more, phase voltages of respective phases can be outputted separately without short-circuit of each of the flying capacitors FC1 and FC2. The circuit is also advantageous in a withstand voltage of the semiconductor element and is advantageous in that there is no semiconductor element through which currents of three phases flow, when compared with the circuits of the related art illustrated in FIGS. 29(a) and 29(b).

The flying capacitors FC1 to FC4 are connected parallel to the second and third semiconductor elements SU2.2, SU2.3, SV2.2, SV2.3, SW2.2, SW2.3, SU4.2, SU4.3, SV4.2, SV4.3, SW4.2, SW4.3, SU1.3, SU1.2, SV1.3, SV1.2, SW1.3, SW1.2, SU3.3, SU3.2, SV3.3, SV3.2, SW3.3 and SW3.2 in the odd-numbered stages and the even-numbered stages.

The voltage selection circuits are configured by semiconductor elements SU19 to SU28, SV19 to SV28, and SW19 to SW28.

By controlling each of voltages of the DC voltage sources DCC1, DCC2, DCC3, and DCC4 to 2E and controlling each of voltages of the flying capacitors FC1, FC2, FC3, and FC4 to E, it is possible to output nine-level voltages of 4E, 3E, 2E, E, 0, −E, −2E, −3E and −4E.

Table 2 shows voltages between the terminal U and the terminal 0 in ON/OFF states of each semiconductor element in the U phase.

TABLE 2

| SU4.2 | SU19 | SU20 | SU27 | SU20 | SU25 | SU26 | SU4.3 | SU21 | SU22 | SU23 | SU24 |
|---|---|---|---|---|---|---|---|---|---|---|---|
| ON  | ON  | ON  | ON  | OFF | OFF | OFF | OFF | OFF | OFF | OFF | OFF |
| OFF | ON  | ON  | ON  | OFF | OFF | OFF | ON  | OFF | OFF | OFF | OFF |
| OFF | OFF | ON  | ON  | OFF | OFF | OFF | OFF | OFF | OFF | OFF | OFF |
| OFF | OFF | OFF | ON  | OFF | OFF | OFF | OFF | ON  | ON  | OFF | OFF |
| OFF | OFF | OFF | ON  | OFF | OFF | OFF | OFF | ON  | ON  | OFF | OFF |
| OFF | OFF | OFF | OFF | ON  | OFF | OFF | OFF | OFF | OFF | ON  | ON  |
| OFF | OFF | OFF | OFF | ON  | ON  | OFF | OFF | OFF | OFF | OFF | OFF |
| OFF | OFF | OFF | OFF | ON  | ON  | ON  | OFF | OFF | OFF | OFF | OFF |
| OFF | OFF | OFF | OFF | ON  | ON  | ON  | OFF | OFF | OFF | OFF | OFF |

| SU17 | SU3.2 | SU3.3 | SU2.2 | SU2.3 | SU18 | SU1.2 | SU1.3 | U |
|---|---|---|---|---|---|---|---|---|
| OFF | OFF | OFF | OFF | OFF | OFF | OFF | OFF | 4E |
| OFF | OFF | OFF | OFF | OFF | OFF | OFF | OFF | 3E |
| ON  | OFF | OFF | OFF | OFF | OFF | OFF | OFF | 2E |
| OFF | ON  | OFF | OFF | OFF | OFF | OFF | OFF | E |
| CFF | OFF | ON  | OFF | OFF | OFF | OFF | OFF | 0 |
| OFF | OFF | OFF | OFF | ON  | OFF | OFF | OFF | −E |
| OFF | OFF | OFF | OFF | OFF | ON  | OFF | OFF | −2E |
| OFF | OFF | OFF | OFF | OFF | OFF | ON  | OFF | −3E |
| OFF | OFF | OFF | OFF | OFF | OFF | OFF | ON  | −4E |

Embodiment 13

Figure 25:
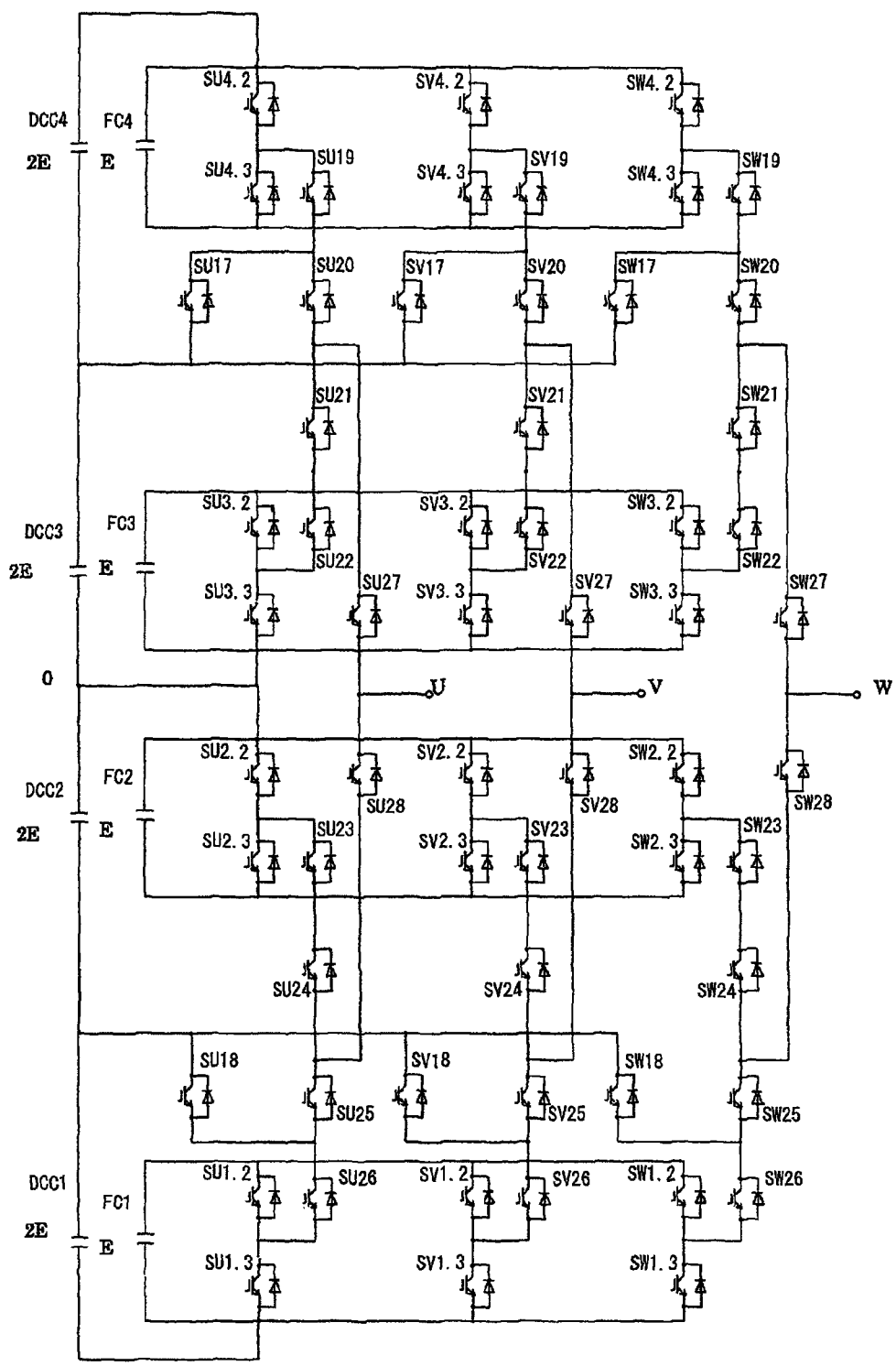
FIG. 25 is a circuit configuration diagram illustrating a multilevel power convertor in Embodiment 13

Next, a multilevel power convertor in Embodiment 13 will be explained with reference to FIG. 25. A configuration of the multilevel power convertor in Embodiment 13 is a configuration in which N=4 and M=3 in the case of Embodiment 4. As the voltage selection circuit, FIGS. 3(a) and 3(d) are used.

The basic circuit includes the second and third semiconductor elements SU2.2, SU2.3, SV2.2, SV2.3, SW2.2, SW2.3, SU4.2, SU4.3, SV4.2, SV4.3, SW4.2 and SW4.3 which are sequentially connected in series to positive electrode ends of the DC voltage sources DCC2 and DCC4 in the even-numbered stages among four serially connected DC voltage sources DCC1 to DCC4; and the third and second semiconductor elements SU1.3, SU1.2, SV1.3, SV1.2, SW1.3, SW1.2, SU3.3, SU3.2, SV3.3, SV3.2, SW3.3 and SW3.2 which are sequentially connected in series to negative electrode ends of the DC voltage sources DCC1 and DCC3 in the odd-numbered stages among the four serially connected DC voltage sources DCC1 to DCC4.

In Embodiment 13, in the same manner as in Embodiments 6 to 12, it is possible to output arbitrary voltages (4E, 3E, 2E, E, 0, −E, −2E, −3E and −4E) from the output terminals U, V and W respectively without short-circuit of each of the flying capacitors FC1 to FC4, and also to simplify control for outputting the voltages of 4E, 3E, 2E, E, 0, −E, −2E, −3E and −4E.

In addition, unlike the circuit configuration of the related art illustrated in FIGS. 29(a) and 29(b), in the case of Embodiment 13, there is no semiconductor element through which currents of three phases of the U phase, the V phase and the W phase flow. Thus, a cooling fin with a high cooling effect is not necessary.

Although the three-phase output circuit has been explained in Embodiment 13, also in a circuit in which the number of output phases is increased to four or more, phase voltages of respective phases can be outputted separately without short-circuit of each of the flying capacitors FC1 to FC4. The circuit is also advantageous in a withstand voltage of the semiconductor element and is advantageous in that there is no semiconductor element through which currents of three phases flow, when compared with the circuits of the related art illustrated in FIGS. 29(a) and 29(b).

Embodiment 14

Next, a multilevel power convertor in Embodiment 14 will be explained with reference to FIG. 26. A configuration of the multilevel power convertor in Embodiment 14 is a configuration in which N=4 and M=3 in the case of Embodiment 3. As the voltage selection circuit FIG. 3(a) is used.

The basic circuit includes the fourth semiconductor elements SU2.4 and SU4.4 whose one ends are connected to negative electrode ends of the DC voltage sources DCC2 and DCC4 in the even-numbered stages among four serially connected DC voltage sources DCC1 to DCC4 and which are in common to three phases; the first to third semiconductor elements SU2.1 to SU2.3, SV2.1 to SV2.3, SW2.1 to SW2.3, SU4.1 to SU4.3, SV4.1 to SV4.3, and SW4.1 to SW4.3 of the three phases which are sequentially connected in series between positive electrode ends of the DC voltage sources DCC2 and DCC4 in the even-numbered stages and the other ends of the fourth semiconductor elements SU2.4 and SU4.4; the fifth semiconductor elements SU2.5, SV2.5, SW2.5, SU4.5, SV4.5 and SW4.5 whose one ends are connected to common connection points of the first and second semiconductor elements SU2.1, SU2.2, SV2.1, SV2.2, SW2.1, SW2.2, SU4.1, SU4.2, SV4.1, SV4.2, SW4.1, and SW4.2 in the even-numbered stages; the first semiconductor elements SU1.1, and SU3.1 whose one ends are connected to positive electrode ends of the DC voltage sources DCC1 and DCC3 in the odd-numbered stages and which are in common to three phases; the second to fourth semiconductor elements SU1.2 to SU1.4, SV1.2 to SV1.4, SW1.2 to SW1.4, SU3.2 to SU3.4, SV3.2 to SV3.4, and SW3.2 to SW3.4 of the three phases which are sequentially connected in series between the other ends of the first semiconductor elements SU1.1, SU3.1 in the odd-numbered stages and negative electrode ends of the DC voltage sources DCC1 and DCC3 in the odd-numbered stages; and the sixth semiconductor elements SU1.6, SV1.6, SW1.6, SU3.6, SV3.6 and SW3.6 of the three phases whose one ends are connected to common connection points of the third and fourth semiconductor elements SU1.3, SU1.4, SV1.3, SV1.4, SW1.3, SU3.3, SU3.4, SV3.3, SV3.4, SW3.3 and SW3.4 in the odd-numbered stages.

The flying capacitors FC2 and FC4 are inserted between all the fifth semiconductor elements SU2.5, SV2.5, SW2.5, SU4.5, SV4.5, SW4.5 in the even-numbered stages and the common connection points of the third and fourth semiconductor elements SU2.3, SV2.3, SW2.3, SU2.4, SU4.3, SV4.3, SW4.3, SU4.4. The flying capacitors FC1 and FC3 are inserted between the common connection points of the first and second semiconductor elements SU1.1, SU1.2, SV1.2, SW1.2, SU3.1, SU3.2, SV3.2, SW3.2 in the odd-numbered stages and all the sixth semiconductor elements SU1.6, SV1.6, SW1.6, SU3.6, SV3.6, SW3.6.

The voltage selection circuit is configured by semiconductor elements SU1 to SU12, SV1 to SV12, and SW1 to SW12.

By controlling each of voltages of the DC voltage sources DCC1, DCC2, DCC3 and DCC4 to 2E and controlling each of voltages of the flying capacitors FC1, FC2, FC3 and FC4 to E, it is possible to output nine-level voltages of 4E, 3E, 2E, E, 0, −E, −2E, −3E and −4E.

In Embodiment 14, in the same manner as in Embodiment 13, it is possible to output arbitrary voltages (4E, 3E, 2E, E, 0, −E, −2E, −3E and −4E) from the output terminals U, V and W respectively without short-circuit of each of the flying capacitors FC1 to FC4, and also to simplify control for outputting the voltages of 4E, 3E, 2E, E, 0, −E, −2E, −3E and −4E.

Figure 26:
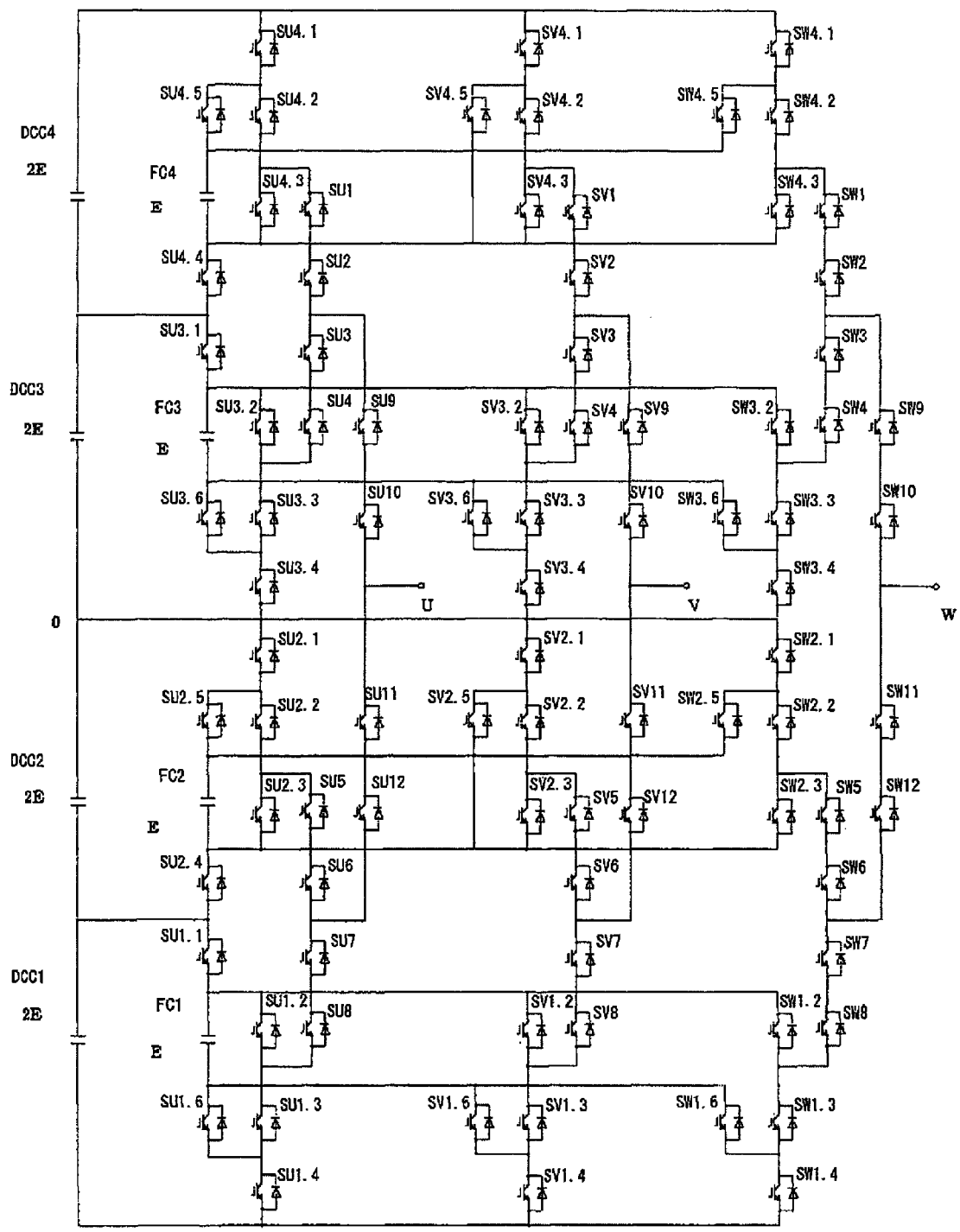
FIG. 26 is a circuit configuration diagram illustrating a multilevel power convertor in Embodiment 14

The circuit illustrated in FIG. 26 is a configuration in which the circuit illustrated in FIG. 13 in Embodiment 7 is doubled.

The semiconductor elements SU1 and SU2, SU3 and SU4, SU5 and SU6, SU7 and SU8, SV1 and SV2, SV3 and SV4, SV5 and SV6, SV7 and SV8, SW1 and SW2, SW3 and SW4, SW5 and SW6, and SW7 and SW8 illustrated in FIG. 26 respectively correspond to the semiconductor elements SU1 and SU2, SU3 and SU4, SV1 and SV2, SV3 and SV4, SW1 and SW2, and SW3 and SW4 illustrated in FIG. 13.

Therefore, in the same manner as in Embodiment 7, the maximum value of a voltage applied to the series connection circuit of the semiconductor elements such as the semiconductor elements SU1 and SU2 in a steady state is each 2E.

Although the three-phase output circuit has been explained in Embodiment 14, also in a circuit in which the number of output phases is increased to four or more, phase voltages of respective phases can be outputted separately without short-circuit of each of the flying capacitors FC1 to FC4. The circuit is also advantageous in a withstand voltage of the semiconductor element and is advantageous in that there is no semiconductor element through which currents of three phases flow, when compared with the circuits of the related art illustrated in FIGS. 29(a) and 29(b).

The invention claimed is:

1. A multilevel power convertor that generates AC outputs with a plurality of voltage levels obtained by conversion of voltages of a DC voltage source and a flying capacitor, the multilevel power convertor comprising:
   N DC voltage sources (N≥2) that are connected in series to each other;
   basic circuits of M phases (M≥3), each of which includes first to fourth semiconductor elements that are sequentially connected in series between positive and negative electrodes of each of the N DC voltage sources; a fifth semiconductor element whose one end is connected to a common connection point of the first and second semiconductor elements; and a sixth semiconductor element whose one end is connected to a common connection point of the third and fourth semiconductor elements;
   a flying capacitor that is inserted between the other ends of the fifth semiconductor elements of all the phases and the other ends of the sixth semiconductor elements of all the phases, the flying capacitor being in common to the M phases; and
   voltage selection circuits of the M phases, each of which has common connection points of the second and third semiconductor elements of each basic circuit as input terminals, includes semiconductor elements between the input terminals and an output terminal, and outputs a potential of any one of the input terminals from the output terminal by selectively controlling ON/OFF of the semiconductor elements.

2. A multilevel power convertor that generates AC outputs with a plurality of voltage levels obtained by conversion of voltages of a DC voltage source and a flying capacitor, the multilevel power convertor comprising:
   N DC voltage sources (N=an even number of 2 or greater) that are connected in series to each other;
   basic circuits that include a first semiconductor element whose one end is connected to a positive electrode end of a DC voltage source in an even-numbered stage of the N serially connected DC voltage sources, the first semiconductor element being in common to M phases (M≥3); second to fourth semiconductor elements of the M phases which are sequentially connected in series between the other end of the first semiconductor element in the even-numbered stage and a negative electrode end of the DC voltage source in the even-numbered stage; sixth semiconductor elements of the M phases whose one ends are connected to common connection points of the third and fourth semiconductor elements in the even-numbered stage; a fourth semiconductor element whose one end is connected to a negative electrode end of a DC voltage source in an odd-numbered stage, the fourth semiconductor element being in common to the M phases; first to third semiconductor elements of the M phases which are sequentially connected in series between a positive electrode end of the DC voltage source in the odd-numbered stage and the other end of the fourth semiconductor element in the odd-numbered stage; and fifth semiconductor elements of the M phases whose one ends are connected to common connection points of the first and second semiconductor elements in the odd-numbered stage;

a flying capacitor in the even-numbered stage that is inserted between a common connection point of the first and second semiconductor elements in the even-numbered stage and the other ends of the sixth semiconductor elements of all the phases in the even-numbered stage, the flying capacitor being in common to the M phases;

a flying capacitor in the odd-numbered stage that is inserted between the other ends of the fifth semiconductor elements of all the phases in the odd-numbered stage and a common connection point of the third and fourth semiconductor elements in the odd-numbered stage, the flying capacitor being in common to the M phases; and voltage selection circuits of the M phases, each of which has common connection points of the second and third semiconductor elements of each basic circuit as input terminals, includes semiconductor elements between the input terminals and an output terminal, and outputs a potential of any one of the input terminals from the output terminal by selectively controlling ON/OFF of the semiconductor elements.

3. A multilevel power convertor that generates AC outputs with a plurality of voltage levels obtained by conversion of voltages of a DC voltage source and a flying capacitor, the multilevel power convertor comprising:

N DC voltage sources (N=an even number of 2 or greater) that are connected in series to each other;

basic circuits that include a fourth semiconductor element whose one end is connected to a negative electrode end of a DC voltage source in an even-numbered stage of the N serially connected DC voltage sources, the fourth semiconductor element being in common to M phases (where M≥3); first to third semiconductor elements of the M phases which are sequentially connected in series between a positive electrode end of the DC voltage source in the even-numbered stage and the other end of the fourth semiconductor element in the even-numbered stage; fifth semiconductor elements of the M phases whose one ends are connected to common connection points of the first and second semiconductor elements in the even-numbered stage; a first semiconductor element whose one end is connected to a positive electrode end of a DC voltage source in an odd-numbered stage, the first semiconductor element being in common to the M phases; second to fourth semiconductor elements of the M phases which are sequentially connected in series between the other end of the first semiconductor element in the odd-numbered stage and a negative electrode end of the DC voltage source in the odd-numbered stage; and sixth semiconductor elements of the M phases whose one ends are connected to common connection points of the third and fourth semiconductor elements in the odd-numbered stage;

a flying capacitor in the even-numbered stage that is inserted between all the fifth semiconductor elements and a common connection point of the third and fourth semiconductor elements in the even-numbered stage, the flying capacitor being in common to the M phases;

a flying capacitor in the odd-numbered stage that is inserted between a common connection point of the first and second semiconductor elements and all the sixth semiconductor elements in the odd-numbered stage, the flying capacitor being in common to the M phases; and voltage selection circuits of the M phases, each of which has common connection points of the second and third semiconductor elements of each basic circuit as input terminals, includes semiconductor elements between the input terminals and an output terminal, and outputs a potential of any one of the input terminals from the output terminal by selectively controlling ON/OFF of the semiconductor elements.

4. A multilevel power convertor that generates AC outputs with a plurality of voltage levels obtained by conversion of voltages of a DC voltage source and a flying capacitor, the multilevel power convertor comprising:

N DC voltage sources (N=an even number of 2 or greater) that are connected in series to each other;

basic circuits of M phases (M≥3), each of which includes second and third semiconductor elements which are sequentially connected in series to a positive electrode end of a DC voltage source in an even-numbered stage of the N serially connected DC voltage sources; and third and second semiconductor elements which are sequentially connected in series to a negative electrode end of a DC voltage source in the odd-numbered stage of the N serially connected DC voltage sources;

a flying capacitor that is connected parallel to the second and third semiconductor elements in each of the even-numbered stage and odd-numbered stage, the flying capacitor being in common to the M phases; and voltage selection circuits of the M phases, each of which has common connection points of the second and third semiconductor elements of each basic circuit and a common connection point of a negative electrode end of the DC voltage source in the even-numbered stage and a positive electrode end of the DC voltage source in the odd-numbered stage as input terminals, includes semiconductor elements between the input terminals and an output terminal, and outputs a potential of any one of the input terminals from the output terminal by selectively controlling ON/OFF of the semiconductor elements.

5. A multilevel power convertor that generates AC outputs with a plurality of voltage levels obtained by conversion of voltages of a DC voltage source and a flying capacitor, the multilevel power convertor comprising:

N DC voltage sources (N=an even number of 2 or greater) that are connected in series to each other;

basic circuits of M phases (M≥3), each of which includes second to fourth semiconductor elements which are sequentially connected in series between positive and negative electrode ends of a DC voltage source in an even-numbered stage of the N serially connected DC voltage sources; a sixth semiconductor element whose one end is connected to a common connection point of the third and fourth semiconductor elements in the even-numbered stage; first to third semiconductor elements which are sequentially connected in series between positive and negative electrode ends of a DC voltage source in an odd-numbered stage of the N serially connected DC voltage sources; and a fifth semiconductor element whose one end is connected to a common connection point of the first and second semiconductor elements in the odd-numbered stage;

a flying capacitor in the even-numbered stage that is inserted between the other ends of all the sixth semiconductor elements in the even-numbered stage and a common connection point of a positive electrode end of the DC voltage source and the second semiconductor element in the even-numbered stage, the flying capacitor being in common to the M phases;

a flying capacitor in the odd-numbered stage that is inserted between the other ends of all the fifth semiconductor elements in the odd-numbered stage and a common connection point of a negative electrode end of the DC voltage source and the third semiconductor element in the odd-numbered stage, the flying capacitor being in common to the M phases; and voltage selection circuits of the M phases, each of which has common connection points of the second and third semiconductor elements of each basic circuit as input terminals, includes semiconductor elements between the input terminals and an output terminal, and outputs a potential of any one of the input terminals from the output terminal by selectively controlling ON/OFF of the semiconductor elements.

6. A multilevel power convertor that generates AC outputs with a plurality of voltage levels obtained by conversion of voltages of a DC voltage source and a flying capacitor, the multilevel power convertor comprising:

N DC voltage sources (N=an even number of 2 or greater) that are connected in series to each other;

basic circuits of M phases (M≥3), each of which includes first to third semiconductor elements which are sequentially connected in series between positive and negative electrode ends of a DC voltage source in an even-numbered stage of the N serially connected DC voltage sources; a fifth semiconductor element whose one end is connected to a common connection point of the first and second semiconductor elements in the even-numbered stage; second to fourth semiconductor elements which are sequentially connected in series between positive and negative electrode ends of a DC voltage source in an odd-numbered stage of the N serially connected DC voltage sources; and a sixth semiconductor element whose one end is connected to a common connection point of the third and fourth semiconductor elements in the odd-numbered stage;

a flying capacitor in the even-numbered stage that is inserted between the other ends of all the fifth semiconductor elements in the even-numbered stage and a common connection point of a negative electrode end of the DC voltage source and the third semiconductor element in the even-numbered stage, the flying capacitor being in common to the M phases;

a flying capacitor in the odd-numbered stage that is inserted between the other ends of all the sixth semiconductor elements in the odd-numbered stage and a common connection point of a positive electrode end of the DC voltage source and the second semiconductor element in the odd-numbered stage, the flying capacitor being in common to the M phases; and voltage selection circuits of the M phases, each of which has common connection points of the second and third semiconductor elements of each basic circuit as input terminals, includes semiconductor elements between the input terminals and an output terminal, and outputs a potential of any one of the input terminals from the output terminal by selectively controlling ON/OFF of the semiconductor elements.

7. The multilevel power convertor as claimed in claim 1, wherein:
the number of series-connection of all or some of the semiconductor elements in the basic circuits and the voltage selection circuits is equal to or greater than 2.

8. The multilevel power convertor as claimed in claim 1, wherein:
the number of parallel-connection of all or some of the semiconductor elements in the basic circuits and the voltage selection circuits is equal to or greater than 2.

9. The multilevel power convertor as claimed in claim 2, wherein:
the number of series-connection of all or some of the semiconductor elements in the basic circuits and the voltage selection circuits is equal to or greater than 2.

10. The multilevel power convertor as claimed in claim 2, wherein:
the number of parallel-connection of all or some of the semiconductor elements in the basic circuits and the voltage selection circuits is equal to or greater than 2.

11. The multilevel power convertor as claimed in claim 3, wherein:
the number of series-connection of all or some of the semiconductor elements in the basic circuits and the voltage selection circuits is equal to or greater than 2.

12. The multilevel power convertor as claimed in claim 3, wherein:
the number of parallel-connection of all or some of the semiconductor elements in the basic circuits and the voltage selection circuits is equal to or greater than 2.

13. The multilevel power convertor as claimed in claim 4, wherein:
the number of series-connection of all or some of the semiconductor elements in the basic circuits and the voltage selection circuits is equal to or greater than 2.

14. The multilevel power convertor as claimed in claim 4, wherein:
the number of parallel-connection of all or some of the semiconductor elements in the basic circuits and the voltage selection circuits is equal to or greater than 2.

15. The multilevel power convertor as claimed in claim 5, wherein:
the number of series-connection of all or some of the semiconductor elements in the basic circuits and the voltage selection circuits is equal to or greater than 2.

16. The multilevel power convertor as claimed in claim 5, wherein:
the number of parallel-connection of all or some of the semiconductor elements in the basic circuits and the voltage selection circuits is equal to or greater than 2.

17. The multilevel power convertor as claimed in claim 6, wherein:
the number of series-connection of all or some of the semiconductor elements in the basic circuits and the voltage selection circuits is equal to or greater than 2.

18. The multilevel power convertor as claimed in claim 6, wherein:

the number of parallel-connection of all or some of the semiconductor elements in the basic circuits and the voltage selection circuits is equal to or greater than 2.

* * * * *